US011260746B2

(12) United States Patent
Denis et al.

(10) Patent No.: US 11,260,746 B2
(45) Date of Patent: Mar. 1, 2022

(54) FUEL TANK ASSEMBLY FOR A VEHICLE

(71) Applicant: BOMBARDIER RECREATIONAL PRODUCTS INC., Valcourt (CA)

(72) Inventors: Andre Denis, Sherbrooke (CA); Simon Filion, Granby (CA); Jean Guillemette, Valcourt (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 358 days.

(21) Appl. No.: 16/319,434

(22) PCT Filed: Jul. 13, 2017

(86) PCT No.: PCT/IB2017/054254
§ 371 (c)(1),
(2) Date: Jan. 21, 2019

(87) PCT Pub. No.: WO2018/020351
PCT Pub. Date: Feb. 1, 2018

(65) Prior Publication Data
US 2019/0291572 A1 Sep. 26, 2019

Related U.S. Application Data

(60) Provisional application No. 62/368,552, filed on Jul. 29, 2016.

(51) Int. Cl.
*B60K 15/063* (2006.01)
*B62D 23/00* (2006.01)
*B60K 15/00* (2006.01)

(52) U.S. Cl.
CPC ............ *B60K 15/063* (2013.01); *B60K 15/00* (2013.01); *B62D 23/005* (2013.01); *B60K 2015/0637* (2013.01)

(58) Field of Classification Search
CPC .................. B60K 15/00; B60K 15/063; B60K 2015/0635; B60K 2015/0636; B60K 2015/0637
See application file for complete search history.

(56) References Cited

U.S. PATENT DOCUMENTS 1,543,819 A * 6/1925 Belden ................. B62D 25/081
280/834
4,723,810 A * 2/1988 Kanemaru ........... B60K 15/063
280/834
(Continued)

FOREIGN PATENT DOCUMENTS

GN 101878146 A 11/2010
JP 2006036073 A 2/2006
(Continued)

OTHER PUBLICATIONS

English translation of RU2536750C2 retrieved from https://patents.google.com/patent/RU2536750C2/en?oq=RU2536750 on Sep. 1, 2020.
English translation of RU2455174C2 retrieved from https://patents.google.com/patent/RU2455174C2/en?oq=RU2455174 on Sep. 1, 2020.
(Continued)

*Primary Examiner* — Barry Gooden, Jr.
(74) *Attorney, Agent, or Firm* — BCF LLP

(57) ABSTRACT

A vehicle has a frame defining a cockpit area. The frame has a roll cage disposed over the cockpit area. The vehicle has driver and passenger seats, an engine connected to the frame, and a plurality of ground engaging members operatively connected to the frame, at least one ground engaging member of the plurality of ground engaging members being operatively connected to the engine. The vehicle also has a fuel tank assembly including a fuel tank connected to the frame. The fuel tank is forward of the seats and at least a portion of the fuel tank is disposed under the roll cage.

23 Claims, 27 Drawing Sheets

(56) References Cited

U.S. PATENT DOCUMENTS

| | | | |
|---|---|---|---|
| 7,464,782 B2 | 12/2008 | Hirawaka et al. | |
| 8,464,824 B1 * | 6/2013 | Reisenberger | B60K 28/10 180/268 |
| 8,548,710 B1 * | 10/2013 | Reisenberger | B60K 28/04 701/93 |
| 8,696,006 B2 | 4/2014 | Sanschagrin et al. | |
| 9,145,038 B2 * | 9/2015 | LeClerc | B60G 17/04 |
| 9,981,519 B2 * | 5/2018 | Despres-Nadeau | B60N 2/00 |
| 2004/0129489 A1 | 7/2004 | Brasseal et al. | |
| 2005/0211496 A1 * | 9/2005 | Ito | B60K 15/063 180/314 |
| 2008/0265556 A1 * | 10/2008 | Kobayashi | B60K 15/03504 280/830 |
| 2009/0322068 A1 * | 12/2009 | Hofner | B60K 15/063 280/834 |
| 2012/0080251 A1 * | 4/2012 | Ohashi | B60K 15/07 180/65.31 |
| 2013/0319785 A1 * | 12/2013 | Spindler | B62D 23/005 180/292 |
| 2014/0202783 A1 * | 7/2014 | Shomura | F02M 25/0854 180/69.4 |
| 2016/0347137 A1 * | 12/2016 | Despres-Nadeau | B60G 3/202 |
| 2017/0043680 A1 * | 2/2017 | Ito | B62D 21/183 |
| 2017/0066479 A1 * | 3/2017 | Murata | B62D 21/15 |
| 2018/0229601 A1 * | 8/2018 | Komatsu | B60K 35/00 |
| 2018/0326842 A1 * | 11/2018 | Sawada | B62D 21/152 |
| 2019/0061518 A1 * | 2/2019 | Hayashi | F02M 37/0023 |
| 2020/0231216 A1 * | 7/2020 | Choi | B62D 21/11 |

FOREIGN PATENT DOCUMENTS

| | | |
|---|---|---|
| JP | 4442978 B2 | 3/2010 |
| RU | 2455174 C2 | 7/2012 |
| RU | 2536750 C2 | 12/2014 |
| WO | 2015114604 A1 | 8/2015 |

OTHER PUBLICATIONS

International Search Report of PCT/IB2017/054254; Shane Thomas; dated Nov. 22, 2017.
Pelican Parts, LLC; 1970 911T Fuel Pump for Zeniths; retrieved from http://forums.pelicanparts.com/porsche-911-technical-forum/602782-1970-911t-fuel-pump-zeniths.html on Jan. 21, 2019.
1987 Porsche Carrera 911 Fuel Tank; retrieved from http://image.superstreetonline.com/f/122528158+w+h+q80+re0+cr1+ar0+st0/1987-porsche-911-carrera-fuel-tank on Jan. 21, 2019.
English translation of JP4442978B2 retrieved from https://patents.google.com/patent/JP4442978B2/en?oq=JP4442978 on Feb. 2, 2021.
English translation of CN101878146A retrieved from https://patents.google.com/patent/CN101878146A/en?oq=CN101878146A on Feb. 4, 2021.
English translation of JP2006036073A retrieved from https://patents.google.com/patent/JP2006036073A/en?oq=JP2006036073 on Feb. 4, 2021.
Office Action issued from the Chinese Patent Office dated Jan. 7, 2021 in connection with the corresponding application No. 201780058641.4 and including the list of references considered by the Examiner.

* cited by examiner

FUEL TANK ASSEMBLY FOR A VEHICLE

CROSS-REFERENCE TO RELATED APPLICATION

The present application claims priority to U.S. Provisional Patent Application Ser. No. 62/368,552, filed Jul. 29, 2016, entitled "Fuel Tank Assembly for a Vehicle", which is incorporated by reference herein in its entirety.

FIELD OF TECHNOLOGY

The present technology relates to a fuel tank assembly for a vehicle.

BACKGROUND

There exist various types of vehicles used mainly in off-road conditions. One such type is the side-by-side off-road vehicle. The name "side-by-side" refers to the seating arrangement of the vehicle in which the driver and a passenger are seated side-by-side. Some side-by-side off-road vehicles also have a second row of seats to accommodate one or more additional passengers. These vehicles typically have an open cockpit, a roll cage and a steering wheel.

It is desirable for side-by-side off-road vehicles to have a compact frame in order to minimize its weight and to improve its overall performance. The configuration and positioning of each one of the components in side-by-side off-road vehicles may therefore be selected in order to provide such a compact frame.

In known side-by-side off-road vehicles, the fuel tank is typically positioned proximate to the engine, in the engine compartment. In vehicles where the engine is mounted at the rear, the fuel tank is generally mounted at the rear of the vehicle behind and/or under the driver and passenger seats. Such positioning of the fuel tank may present the drawback of requiring room inside the engine compartment, which already contains several components, and may lead to an increase of the overall dimensions of the engine compartment. Therefore, the dimensions of the frame of the vehicle may be increased and consequently, the weight of the vehicle may be increased and its performance may be decreased.

Thus, there is a desire for positioning the fuel tank of the side-by-side off-road vehicle in a location that would minimize these issues.

SUMMARY

It is an object of the present technology to ameliorate at least some of the inconveniences present in the prior art.

According to one aspect of the present technology, there is provided a vehicle having a frame defining a cockpit area. The frame has a roll cage disposed over the cockpit area. The vehicle has driver and passenger seats, an engine connected to the frame, and a plurality of ground engaging members operatively connected to the frame. At least one ground engaging member of the plurality of ground engaging members is operatively connected to the engine. The vehicle also has a fuel tank assembly including a fuel tank connected to the frame. The fuel tank is forward of the seats and at least a portion of the fuel tank is disposed under the roll cage.

In some implementations of the present technology, a majority of the fuel tank is disposed under the roll cage.

In some implementations of the present technology, the frame further has a cockpit module including the cockpit area and the roll cage. The frame further has a front suspension module disposed forward of the cockpit module and connected thereto. At least a majority of the fuel tank is disposed rearward of the front suspension module. The frame further has a rear suspension module disposed rearward of the cockpit module and connected thereto. The fuel tank is disposed completely forward of the rear suspension module, and the engine is disposed rearward of the cockpit area in the rear suspension module.

In some implementations of the present technology, the fuel tank is disposed forward of the cockpit area and rearward of a front end of the frame.

In some implementations of the present technology, the driver seat is disposed on a first side of a longitudinal centerline of the vehicle, the passenger seat is disposed on a second side of the longitudinal centerline of the vehicle, and a majority of the fuel tank is disposed on the second side.

In some implementations of the present technology, at least the portion of the fuel tank is disposed under a projection of the roll cage onto a horizontal plane.

In some implementations of the present technology, members of the frame disposed forward of the seat form a cage, and the fuel tank is housed in the cage.

In some implementations of the present technology, a fender wall is connected to the frame and the fuel tank is disposed rearward of the fender wall.

In some implementations of the present technology, a cockpit front wall is connected to the frame. The cockpit front wall is disposed forward of the passenger seat. The fuel tank is disposed forward of the cockpit front wall.

In some implementations of the present technology, the vehicle further has a fender wall connected to the frame, and a cockpit front wall connected to the frame. The cockpit front wall is disposed forward of the driver and passenger seats and rearward of the fender wall. The fuel tank is disposed longitudinally between the cockpit front wall and the fender wall.

In some implementations of the present technology, the fuel tank assembly further has a fuel pump fluidly connected to the fuel tank, and a fuel line fluidly communicating the fuel tank with the engine for delivering fuel from the fuel tank to the engine, the fuel line passing between the driver and passenger seats.

In some implementations of the present technology, the vehicle further has a front shock absorber assembly pivotally connected to the frame at a first upper connection point, and a rear shock absorber assembly pivotally connected to the frame at a second upper connection point. The fuel tank is disposed below a line passing through the first and second upper connection points of the front and rear shock absorber assemblies to the frame.

In some implementations of the present technology, the fuel tank assembly further has a filler neck connected to the fuel tank. The roll cage has longitudinal legs each having a front end. The filler neck is disposed rearward of the front ends of the longitudinal legs of the roll cage.

In some implementations of the present technology, the filler neck extends vertically higher than the front ends of the longitudinal legs of the roll cage.

In some implementations of the present technology, the filler neck extends upward, rightward and rearward from a top, right and rear portion of the fuel tank.

In some implementations of the present technology, the vehicle further has body panels connected to the frame, and at least one of the body panels is disposed over the filler neck.

In some implementations of the present technology, the fuel tank is disposed in front of the passenger seat.

In some implementations of the present technology, the vehicle further has a foot well and a foot rest disposed in front of the passenger seat, and the fuel tank is disposed above the foot well and the foot rest.

In some implementations of the present technology, a portion of the fuel tank defines a recess above the foot rest.

In some implementations of the present technology, the driver seat and the passenger seat are portions of a bench seat connected to the frame and being disposed in the cockpit area.

In some implementations of the present technology, the vehicle further has a dashboard connected to the frame, the dashboard including a storage box, and the fuel tank is disposed in front of the storage box.

In some implementations of the present technology, the vehicle further has a windshield having a top edge and a bottom edge, the windshield being connected to the roll cage forward of the cockpit area. The fuel tank is disposed below and forward of the top edge of the windshield, and at least a majority of the fuel tank is disposed below and rearward of the bottom edge of the windshield.

In some implementations of the present technology, the vehicle is a side-by-side off-road vehicle.

One of the objects of the present technology is to keep the center of gravity of the vehicle low. As mentioned above, in vehicles where the engine is mounted at the rear, the fuel tank is generally mounted at the rear of the vehicle behind and/or under the driver and passenger seats. The fuel tank, even full of fuel, is generally lighter than a driver or a passenger of the vehicle. By moving the fuel tank from a location under the driver and/or the passenger seats to a location that is forward of the seats and where at least a portion of the fuel tank is disposed under the roll cage, the driver and passenger seats can be connected to the frame of the vehicle lower than if the fuel tank was disposed under the driver and/or passenger seats. This has the effect of lowering the center of gravity of the vehicle. In addition, moving the fuel tank to a location that is forward of the seats clears space for mounting the engine and other components of the vehicle behind the driver and passenger seats. Thus, other components of the vehicle can be disposed at this location and/or the overall dimensions of the frame of the vehicle can be reduced.

For purposes of this application, terms related to spatial orientation such as forward, rearward, upwardly, downwardly, upper, lower, left, and right, are as they would normally be understood by a driver of the vehicle sitting thereon in a normal riding position. Terms related to spatial orientation when describing or referring to components or sub-assemblies of the vehicle, separately from the vehicle should be understood as they would be understood when these components or sub-assemblies are mounted to the vehicle, unless specified otherwise in this application.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Should there be any difference in the definitions of term in this application and the definition of these terms in any document included herein by reference, the terms as defined in the present application take precedence.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

Figure 1:
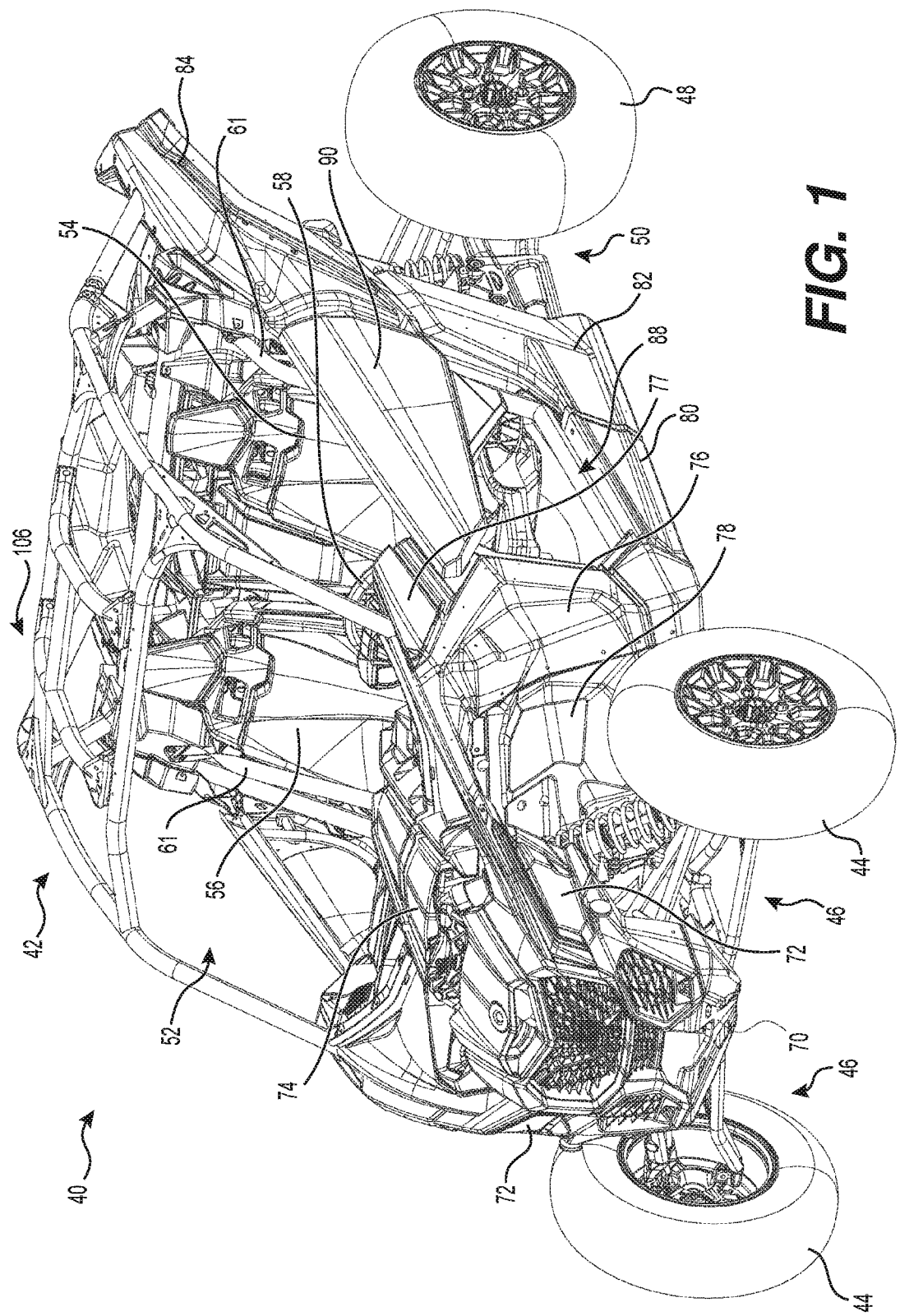
FIG. 1 is a perspective view of an off-road vehicle taken from a front, left side.

Referring to FIG. 1, the present technology will be described with respect to a four-wheel side-by-side off-road vehicle 40 having two side-by-side seats 54, 56 and a steering wheel 58. However, it is contemplated that some aspects of the present technology may apply to other types of vehicles such as, but not limited to, off-road vehicles having more or less than four wheels and/or more or less than two seats.

The general features of the off-road vehicle 40 will be described with respect to FIGS. 1 to 6. The vehicle 40 has a frame 42, two front wheels 44 connected to a front of the frame 42 by front suspension assemblies 46 and two rear wheels 48 connected to the frame 42 by rear suspension assemblies 50 such as those described in U.S. patent application Ser. No. 15/010,773, filed Jan. 29, 2016, the entirety of which is incorporated herein by reference. Each one of the front and rear wheels 44, 48 has a rim 45 and a tire 47. The rims 45 and tires 47 of the front wheels 44 may differ in size from the rims and tires of the rear wheels 48. Each front suspension assembly 46 has a front shock absorber assembly 47 including a shock absorber 49 and a spring 51. Each rear suspension assembly 50 has a rear shock absorber assembly 53 including a shock absorber 55 and a spring 57. Ground engaging members other than wheels 44, 48 are contemplated for the vehicle 40, such as tracks or skis. In addition, although four ground engaging members are illustrated in the Figures, the vehicle 40 could include more or less than four ground engaging members. Furthermore, different combinations of ground engaging members, such as tracks used in combination with skis, are contemplated.

Figure 6:
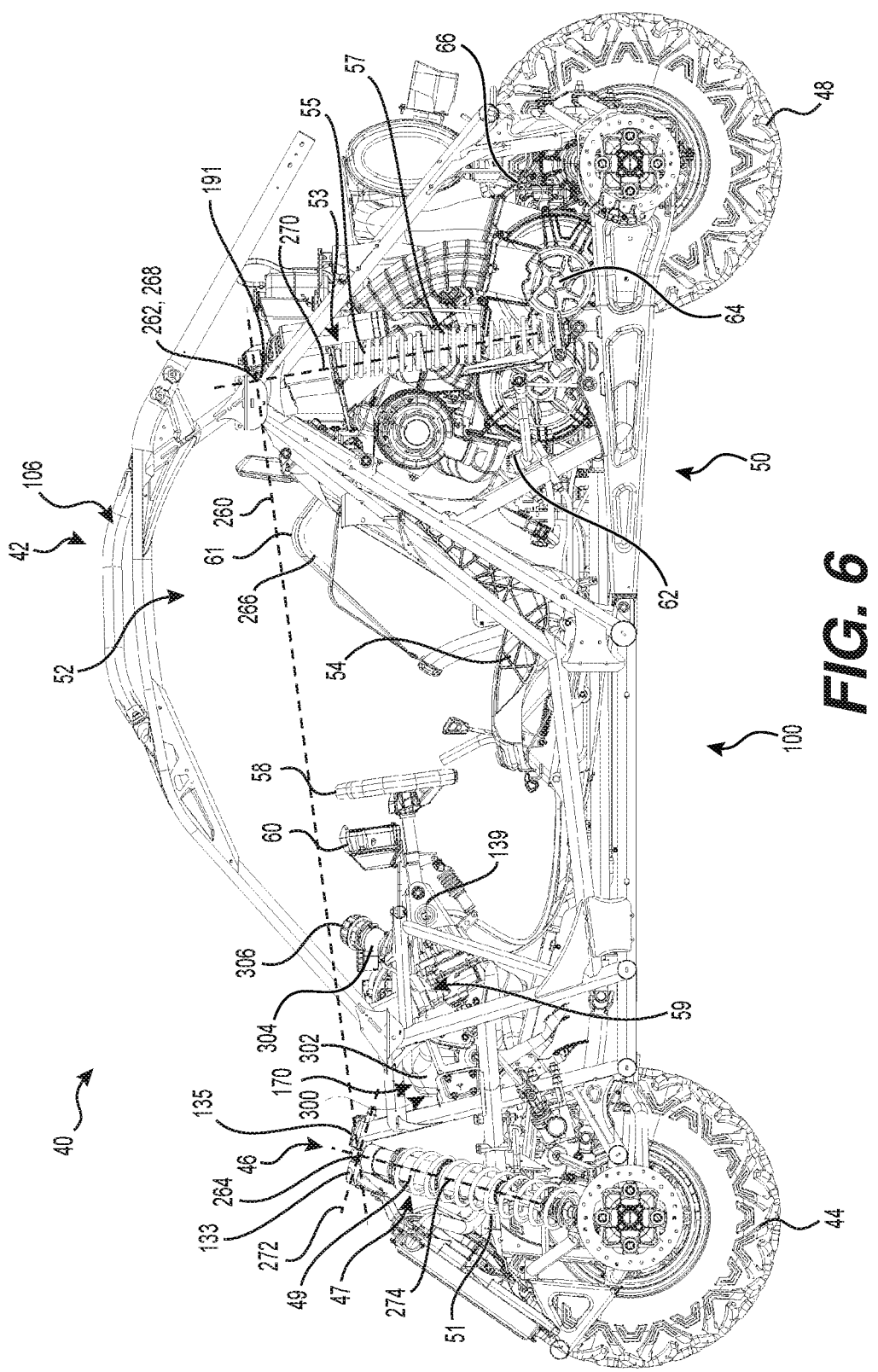
FIG. 6 is a left side elevation view of the vehicle of FIG. 1, with body panels and the left wheels removed.
Figure 23:
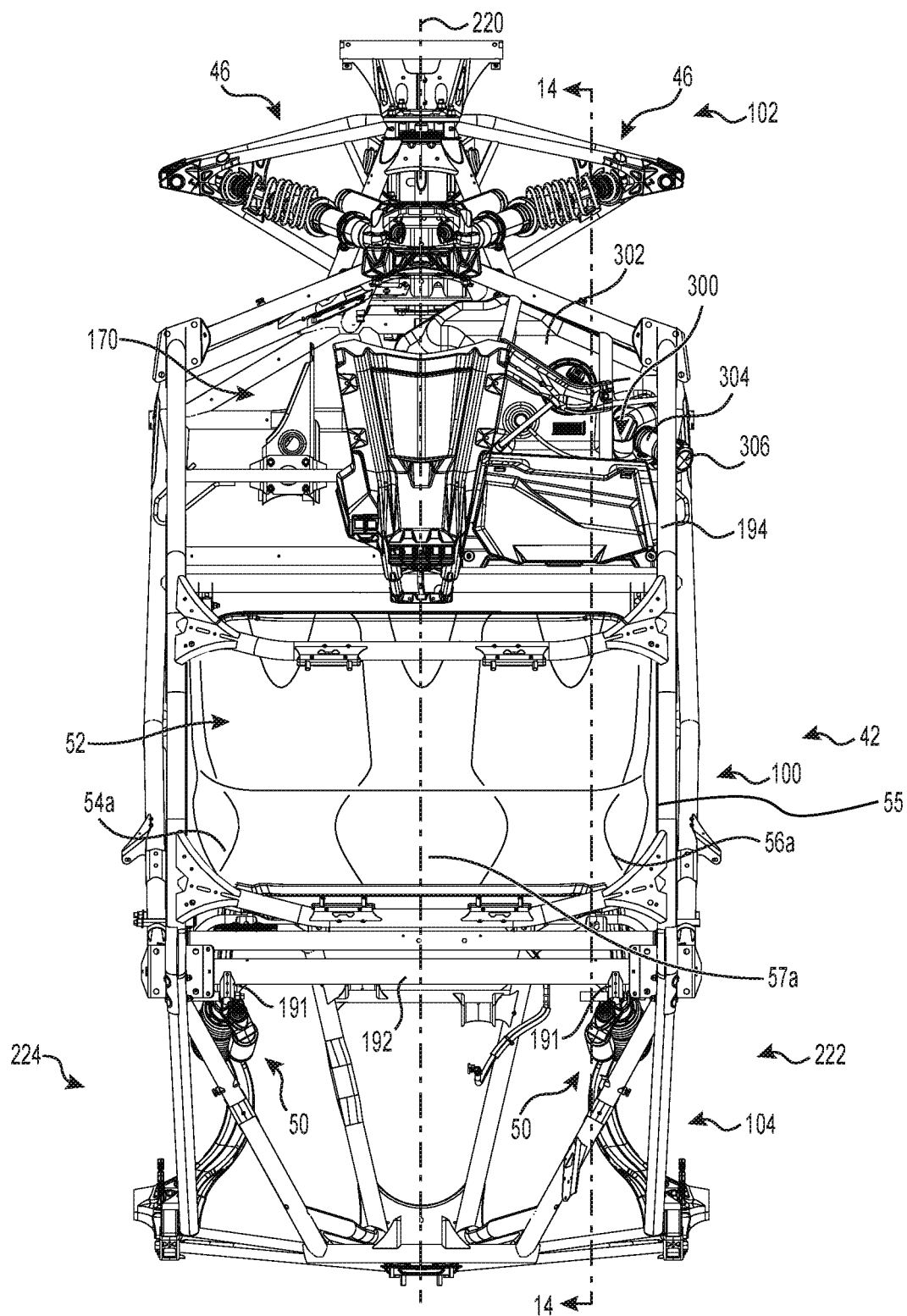
FIG. 23 is a top plan view of the components of FIG. 11, with the driver and passenger seats replaced by a bench seat.

The frame 42 defines a central cockpit area 52 inside which are disposed a driver seat 54 and a passenger seat 56. In the present implementation, the driver seat 54 is disposed on the left side of the vehicle 40 and the passenger seat 56 is disposed on the right side of the vehicle 40. However, it is contemplated that the driver seat 54 could be disposed on the right side of the vehicle 40 and that the passenger seat 56 could be disposed on the left side of the vehicle 40. In an alternative implementation illustrated in FIG. 23, the driver seat and the passenger seat are portions 54a, 56a of a bench seat 55 further including a central seat portion 57a. The bench seat 55 is connected to the frame 42 and is disposed in the cockpit area 52. The bench seat 55 provides room for one driver sitting on the driver seat portion 54a, and two passengers, one sitting on the passenger seat portion 56a and the other sitting on the central seat portion 57. The driver and the two passengers sit abreast on the bench seat 55. Referring back to FIG. 1, the vehicle 40 further has a seat belt 61 for each one of the seats 54, 56. A steering wheel 58 is disposed in front of the driver seat 54. The steering wheel 58 is used to turn the front wheels 44 to steer the vehicle 40. As can be seen in FIG. 6, the vehicle 40 further has a power steering motor assembly 59 operatively connected to the steering wheel 58. Various displays and gauges 60 are disposed above and forward of the steering wheel 58 to provide information to the driver regarding the operating conditions of the vehicle 40. Examples of displays and gauges 60 include, but are not limited to, a speedometer, a tachometer, a fuel gauge, a transmission position display, and an oil temperature gauge.

As can be seen in FIG. 6, an engine 62 is connected to the frame 42 in a rear portion of the vehicle 40. The engine 62 is connected to a continuously variable transmission (CVT) 64 disposed on a left side of the engine 62. The CVT 64 is operatively connected to a transaxle 66 to transmit torque from the engine 62 to the transaxle 66. The transaxle 66 is disposed behind the engine 62. The transaxle 66 is operatively connected to the front and rear wheels 44, 48 to propel the vehicle 40.

Figure 2:
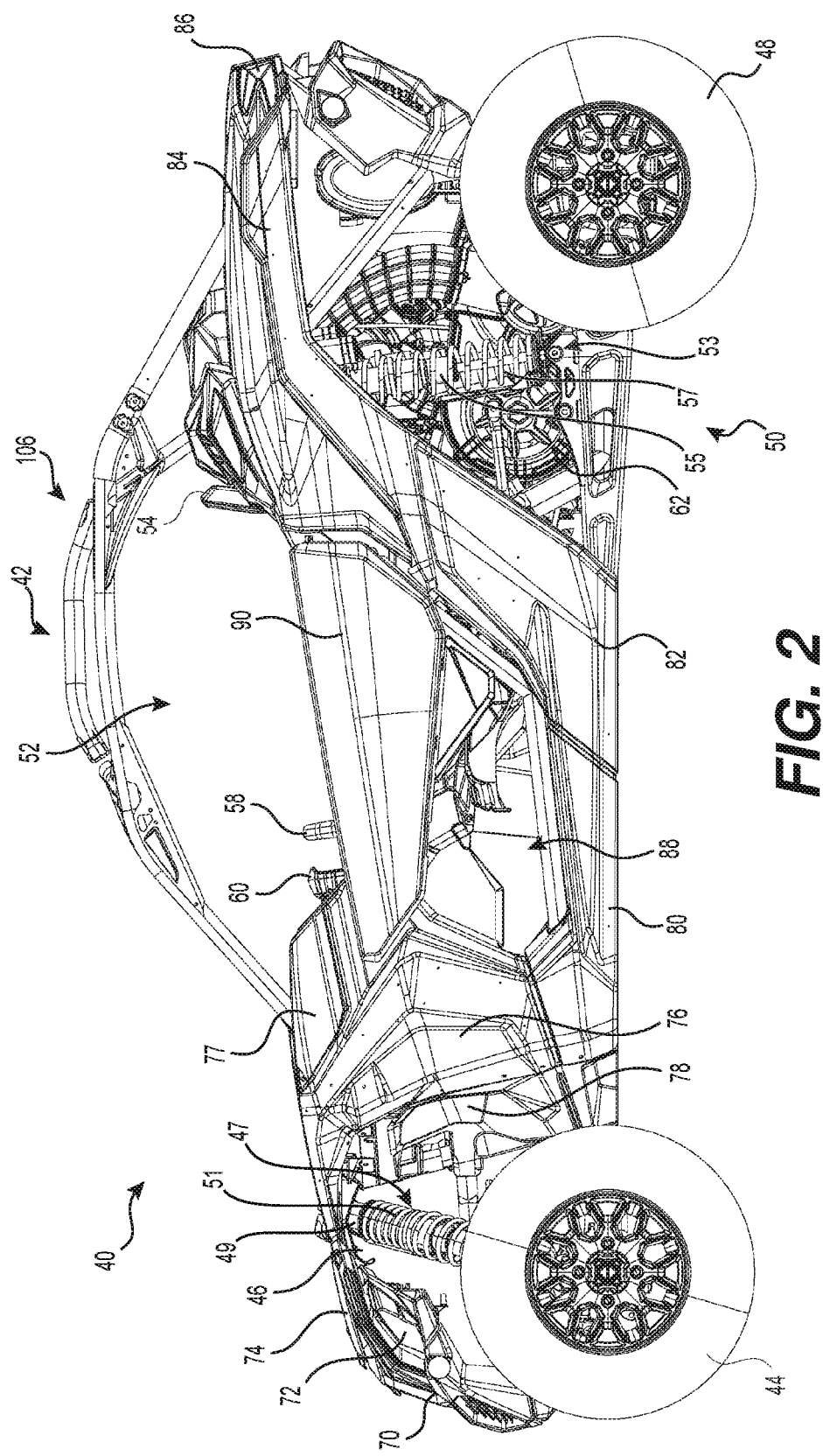
FIG. 2 is a left side elevation view of the vehicle of FIG. 1.
Figure 3:
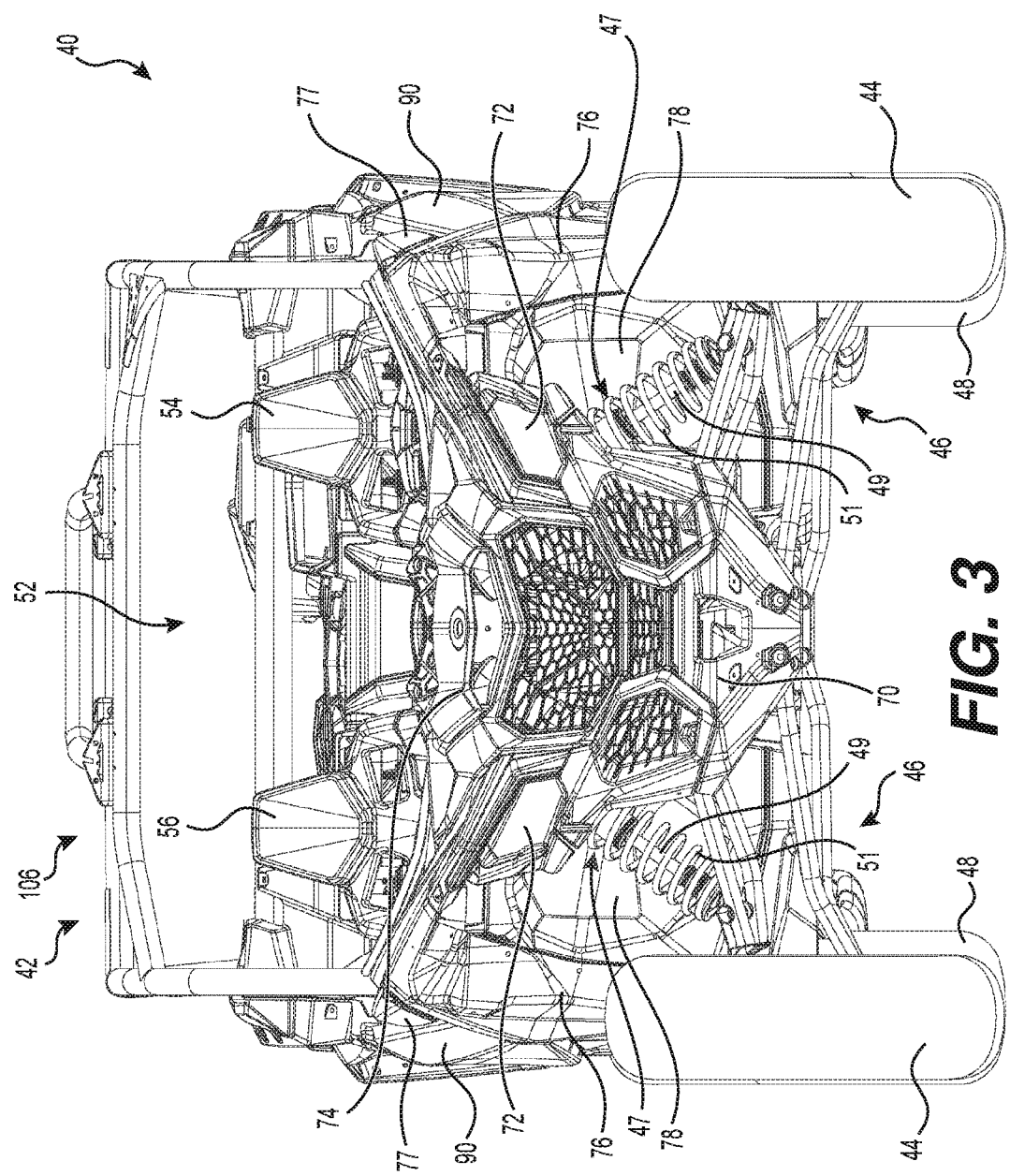
FIG. 3 is a front elevation view of the vehicle of FIG. 1.
Figure 4:
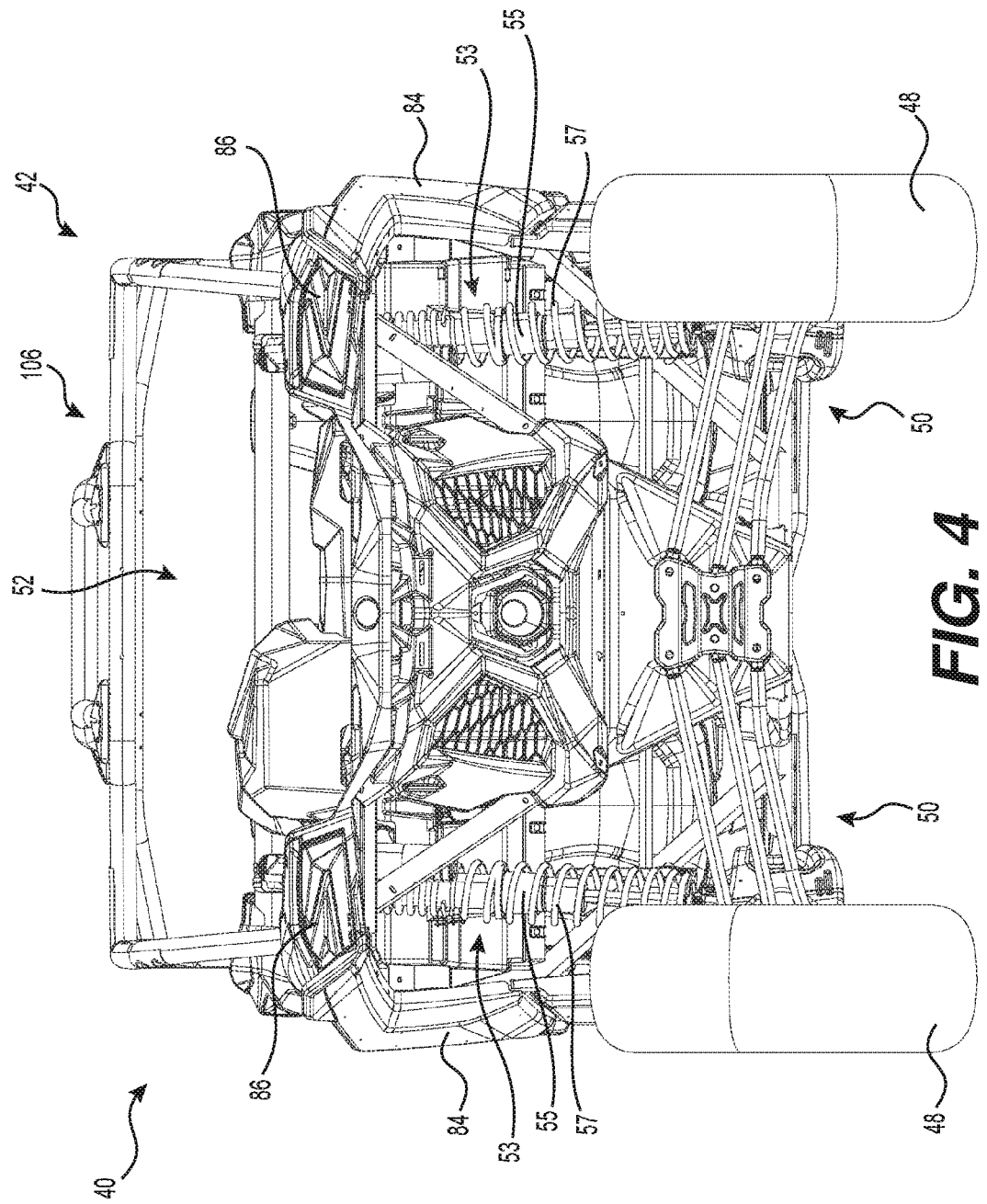
FIG. 4 is a rear elevation view of the vehicle of FIG. 1.
Figure 5:
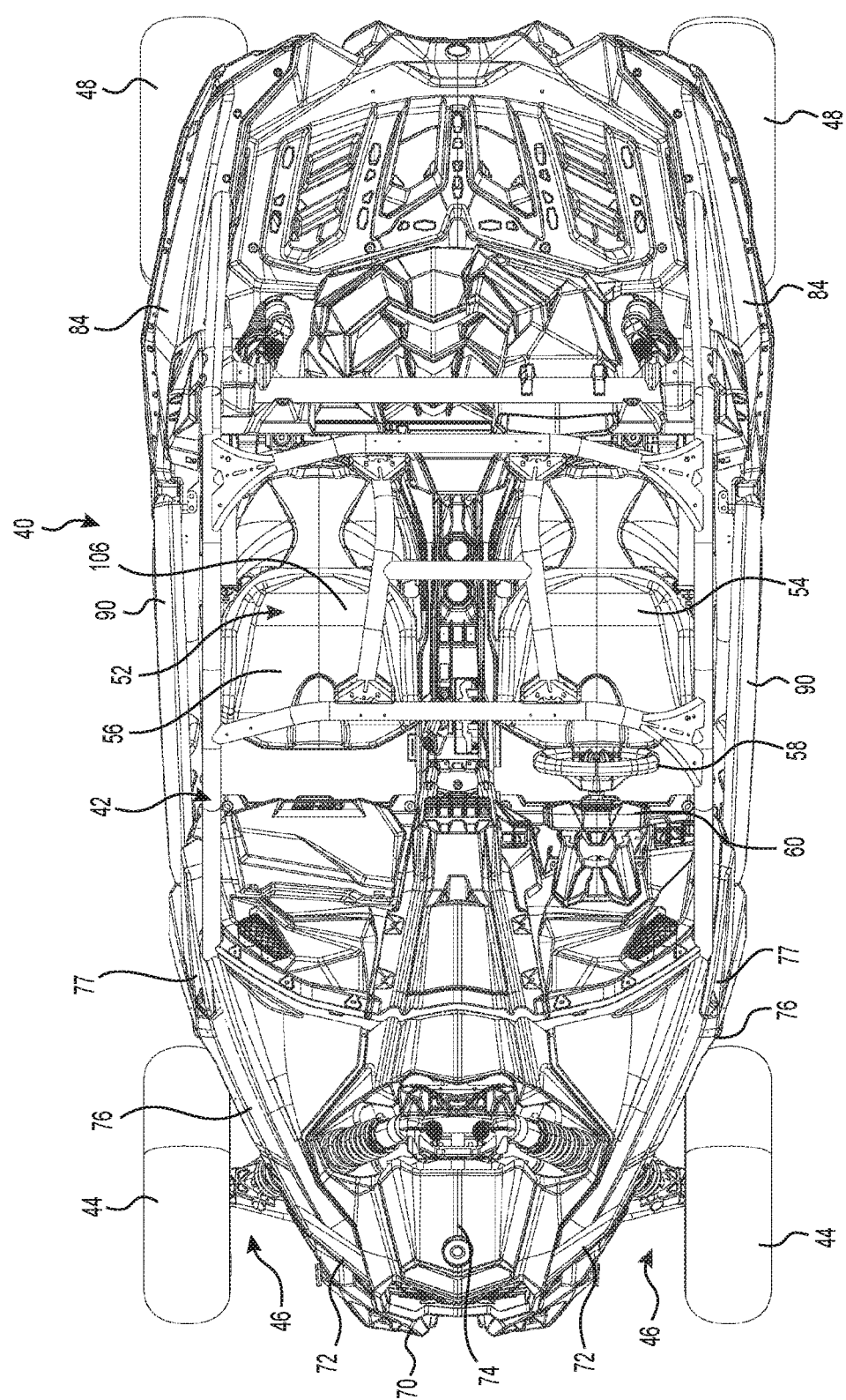
FIG. 5 is a top plan view of the vehicle of FIG. 1.

Referring to FIGS. 1 to 5, body panels of the vehicle 40 will be described. The body panels are connected to the frame 42. The body panels help protect the internal components of the vehicle 40 and provide some of the aesthetic features of the vehicle 40. Front panels 70 are connected to a front of the frame 42. The front panels 70 are disposed forward of the front suspension assemblies 46 and laterally between the front wheels 44. The front panels 70 define two apertures inside which the headlights 72 of the vehicle 40 are disposed. A cover 74 extends generally horizontally rearward from a top of the front panels 70. Front fenders 76 are disposed rearward of the front panels 70 on each side of the vehicle 40. Each front fender 76 is disposed in part above and in part behind of its corresponding front wheel 44. As best seen in FIGS. 1 to 3, a side panel 77 is disposed above and rearward of the front fender 76 on each side of the vehicle 40. A front fender wall 78 is disposed inward of the fender 76 on each side of the vehicle 40 and is connected to the frame 42. The front fender 76 and the front fender wall 78 define a wheel well on each side of the vehicle 40. Lower panels 80 extend along the bottom of the frame 42 between the front and rear wheels 44, 48. As can be seen in FIG. 2 for the left lower panel 80, each lower panel 80 has a front end disposed under the bottom portion of its corresponding front fender 76 and extends rearward therefrom. A generally L-shaped panel 82 is disposed behind the rear end of each lower panel 80. Generally L-shaped rear fenders 84 extend upward and then rearward from the rear, upper ends of the L-shaped panels 82. Each rear fender 84 is disposed in part above and in part forward of its corresponding rear wheel 48. The rear fenders 84 define apertures at the rear thereof to receive the brake lights 86 of the vehicle 40. It is contemplated that the brake lights 86 could be replaced with reflectors, or that reflectors could be provided in addition to the brake lights 86.

On each side of the vehicle 40, the front fender 76, the lower panel 80, the L-shaped panel 82 and the rear fender 84 define a passage 88 through which a driver (or passenger depending on the side of the vehicle 40) can enter or exit the vehicle 40. Each side of the vehicle 40 is provided with a door 90 that selectively closes an upper portion of the corresponding passage 88. Each door 90 is hinged at a rear thereof to brackets 92 (FIGS. 7 and 8) connected to the frame 42. Each door 90 is selectively connected at a front thereof to a frame element 94 via a releasable latch (not shown) provided in the door 90. It is contemplated that each door 90 could be hinged at a front thereof and latched at a rear thereof.

With reference to FIGS. 7 to 10B, the frame 42 of the vehicle 40 will be described in more detail. The frame 42 has a cockpit module 100, a front suspension module 102 and a rear suspension module 104. As their names suggest, the front suspension module 102 is disposed in front of the cockpit module 100 and is connected thereto. The rear suspension module 104 is disposed behind the cockpit module 100 and is connected thereto.

Figure 11:
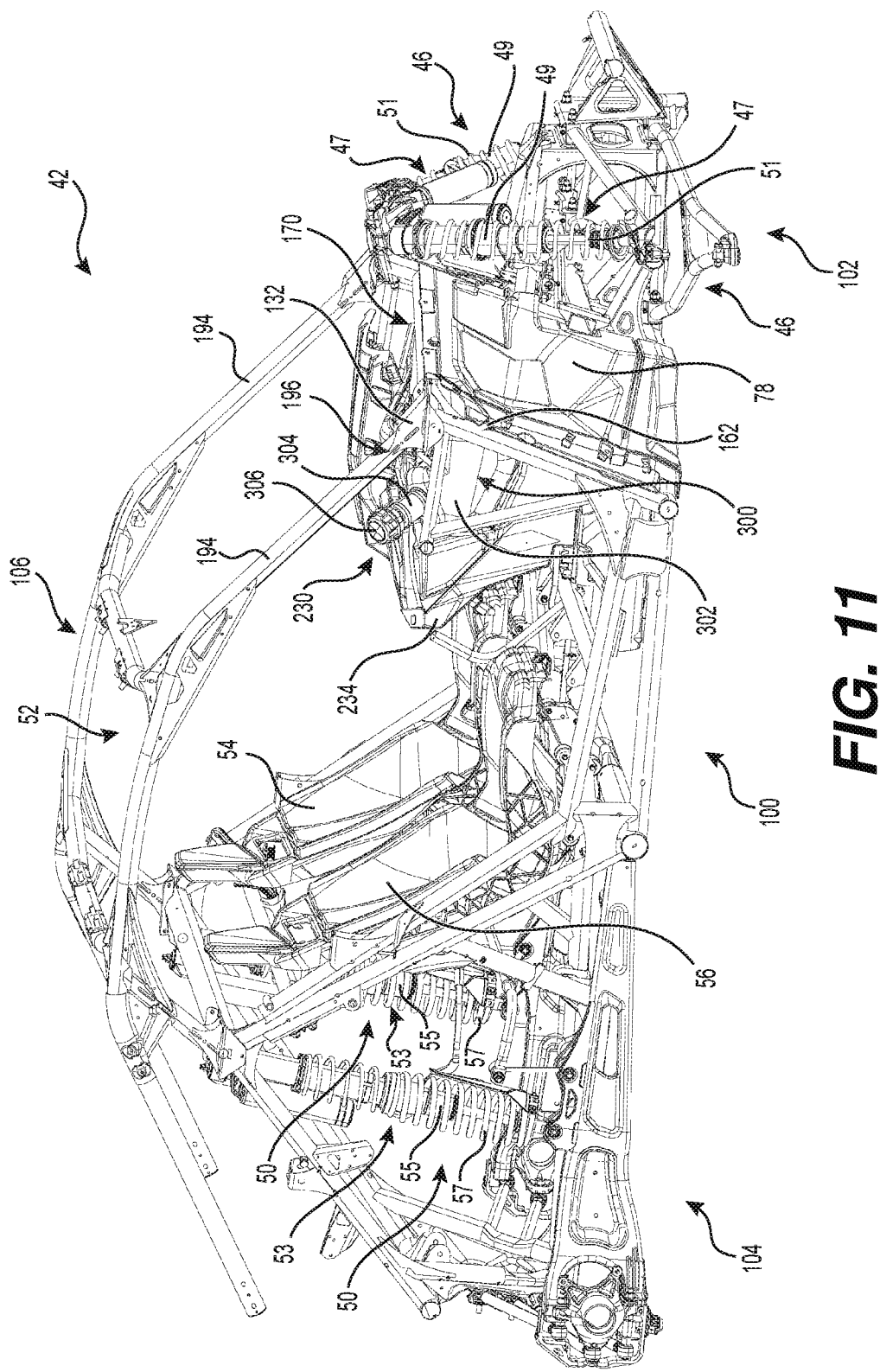
FIG. 11 is a perspective view of the frame of FIG. 7 taken from a front, right side, with front and rear suspension assemblies, seats, a dashboard and a right fender wall.

The cockpit module 100 defines the cockpit area 52 in which the seats 54, 56 are disposed. The cockpit module 100 also defines a roll cage 106. It is contemplated that the cockpit area 52 and/or the roll cage 106 could be at least partially defined by one or more members that are part of the front suspension module 102 or the rear suspension module 104. As best seen in FIG. 11, the front suspension assemblies 46 are connected to the cockpit module 100 and the front suspension module 102 of the frame 42. The engine 62, the CVT 64 and the transaxle 66 are supported by the rear suspension module 104 of the frame 42 (FIG. 6). The rear suspension assemblies 50 are connected to the cockpit module 100 and the rear suspension module 104 of the frame 42. The frame 42 is made from a plurality of hollow cylindrical steel members and steel brackets that are welded to each other. It is contemplated that at least some of the hollow cylindrical members could be replaced by other types of members such as solid cylindrical members, hollow tubes having a cross-section other than circular, and beams, for example. It is also contemplated that the members and brackets could be made of another type of metal, such as aluminum for example. It is also contemplated that at least some of the members and brackets could be made of a non-metallic material, such as composite materials or plastics for example. It is also contemplated that at least some of the members and brackets could be joined to each other by means other than welding, such as by fastening and bonding for example. It is also contemplated that two or more of the members and brackets described below could be cast or otherwise formed as a single component. It is also contemplated that the frame 42 could have more or less members and brackets than described below depending on the type of materials used, the required strength and rigidity of the frame 42 and the weight of the components attached to the frame 42 for example.

Figure 10A:
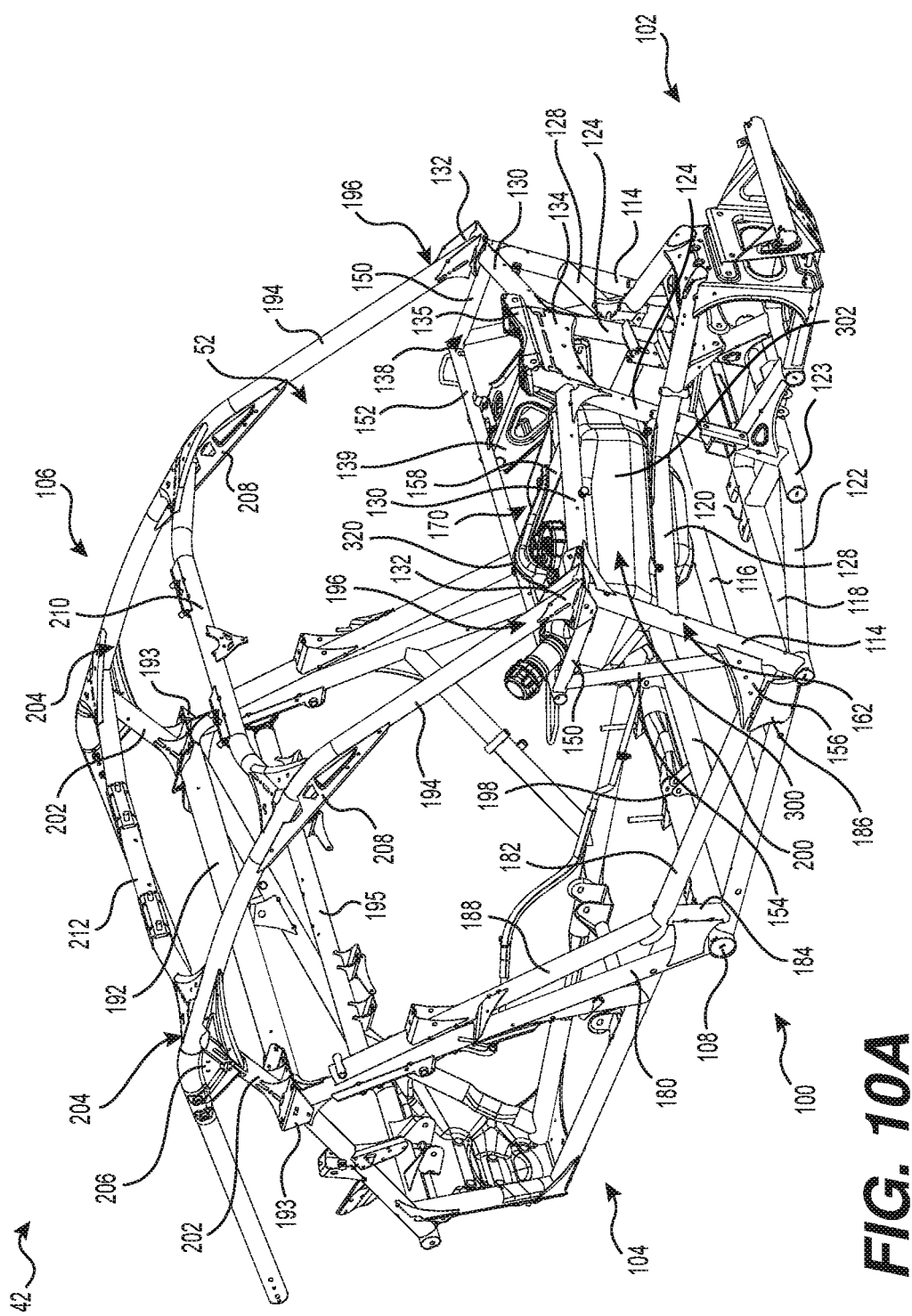
FIG. 10A is a perspective view of the frame of FIG. 7 taken from a front, right side.
Figure 10B:
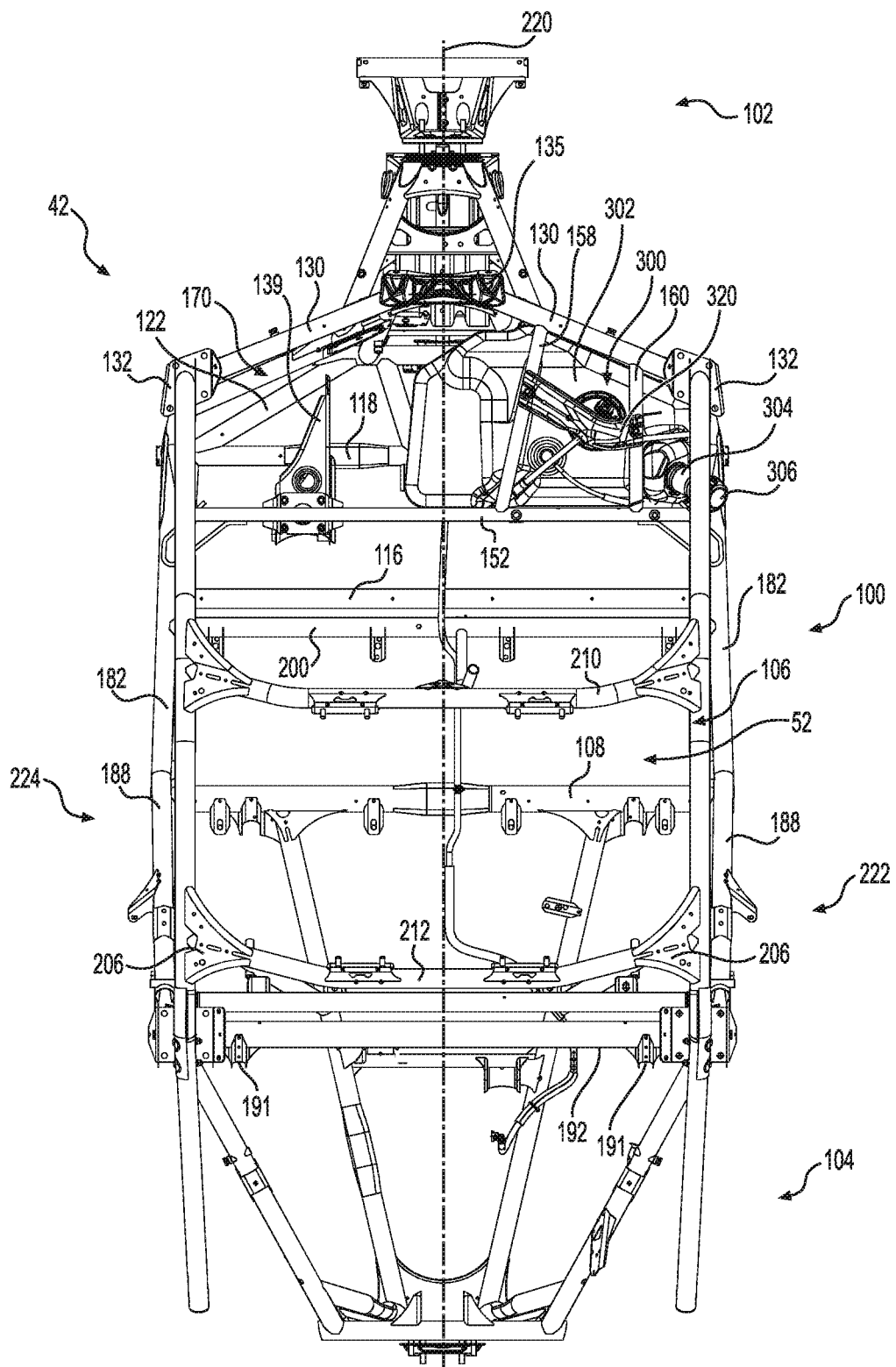
FIG. 10B is a top plan view of the frame of FIG. 7.

The cockpit module 100 of the frame 42 will now be described in greater detail with reference to FIGS. 7 to 10A. The cockpit module 100 has a laterally extending bottom member 108. Brackets 110 are connected to the rear of the laterally extending bottom member 108 and extend rearward therefrom. The brackets 110 are disposed laterally inward of the ends of the laterally extending bottom member 108. The brackets 110 are used to connect the rear suspension assemblies 50. Two bottom members 112 are connected at their rear ends to the ends of the laterally extending bottom member 108. From the laterally extending bottom member 108, the bottom members 112 extend forward and laterally inward, as best seen in FIG. 10A. A laterally extending bottom member 116 is connected to and extends between the two bottom members 112. The bottom member 116 is disposed forward of the laterally extending bottom member 108. The front ends of the bottom members 112 are connected to the rear of a laterally extending bottom member 118. The laterally extending bottom member 118 is disposed forward of the bottom member 116. A bracket 120 is connected to the laterally extending bottom member 118. Generally vertical members 114 extend upward from the ends of the laterally extending bottom member 118. Diagonal members 122 extend forward and laterally inward from the ends of the laterally extending bottom member 118 and connect at their front ends to a laterally extending bottom member 123. The laterally extending bottom member 123 is disposed forward of the laterally extending bottom member 118. The members 108, 112, 114, 116, 118, 122 and 123 are straight, but it is contemplated that the members could be configured otherwise.

From their bottom ends, the generally vertical members 114 extend upward, forward and laterally inward. Two other generally vertical members 124 are connected at their bottom ends to the top of the laterally extending bottom member 123. From their bottom ends, the generally vertical members 124 extend upward, forward and laterally inward. As can be seen in FIG. 10A, the generally vertical members 124 are disposed forward of the generally vertical members 114. As can also be seen in FIG. 10A, the top ends of the generally vertical members 124 are vertically higher than the top ends of the generally vertical members 114. For each pair of generally vertical member 114 and its corresponding generally vertical member 124, i.e. positioned on the same side of the frame 42, generally horizontal members 128 and 130 are connected to and extend between the generally vertical members 114, 124. The generally horizontal members 130 are disposed vertically higher than the generally horizontal members 128. The generally horizontal members 130 are connected to the top ends of the generally vertical members 114 and below the top ends of the generally vertical members 124. Brackets 132 are connected to the top of notches formed in the laterally outer ends of the members 130. A bracket 134 is connected to and extends between the generally vertical members 124. Another bracket 135 is connected to the top ends of the vertical members 124. The front shock absorber assemblies 47 are pivotally connected to the bracket 135 (FIG. 6). A bracket 133 is disposed in front of the upper ends of the front shock absorber assemblies 47 of the left and right front suspension assemblies 46 such that the upper ends of the front shock absorber assemblies 47 are held between the bracket 133 and the bracket 135. The members 114, 122, 123, 124, 128 and 130 and the bracket 134 form a barrier at the front of the cockpit module 100. The vertical spacing between the members 122, 128 and between the members 128, 130 is selected to be less than the diameter of the rims 45 of the front wheels 44. A plate 136 is connected to a top of the left horizontal member 128 and to the left of the left generally vertical member 124. The plate 136 is used to connect various components of the braking system to the frame 42, such as the master cylinder (not shown).

A support frame structure 138 is disposed behind and is connected to the barrier formed by the members 114, 122, 123, 124, 128, 130 and the bracket 134. The frame structure 138 is used to connect a bracket 139 used to support the steering wheel 58 on a left side thereof and to connect at least partially a fuel tank assembly 300 on a right side thereof. The fuel tank assembly 300 and its positioning with respect to the frame 42 will be described in more detail below. As would be understood, in countries where regulations require the steering wheel 58 to be disposed on the right side of the vehicle 40, the bracket 139 used to support the steering wheel 58 would be connected on the right side of the frame structure 138 and the fuel tank assembly 300 would be connected on the left side of the frame structure 138.

Figure 7:
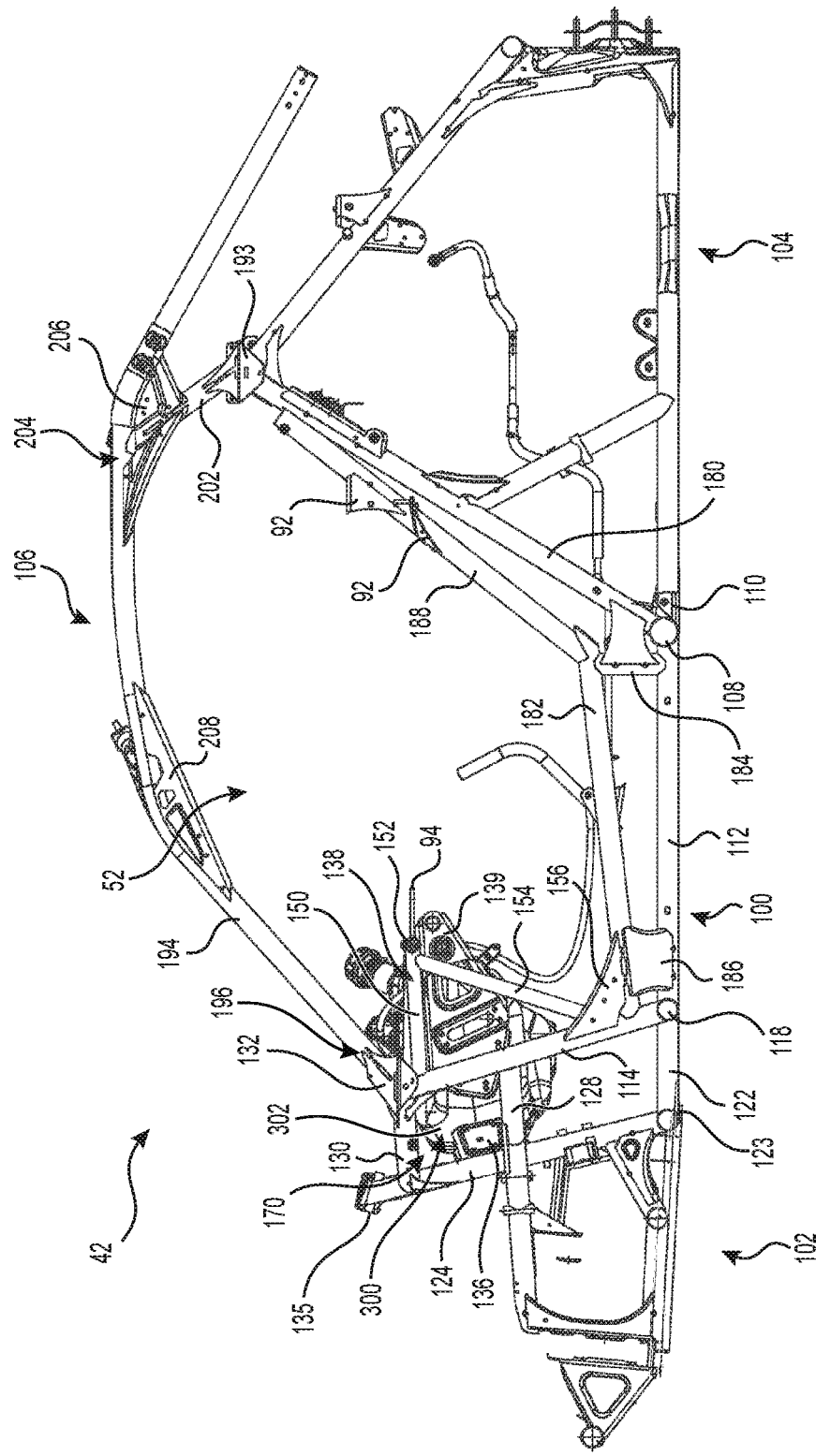
FIG. 7 is a left side elevation view of the frame of the vehicle of FIG. 1.
Figure 8:
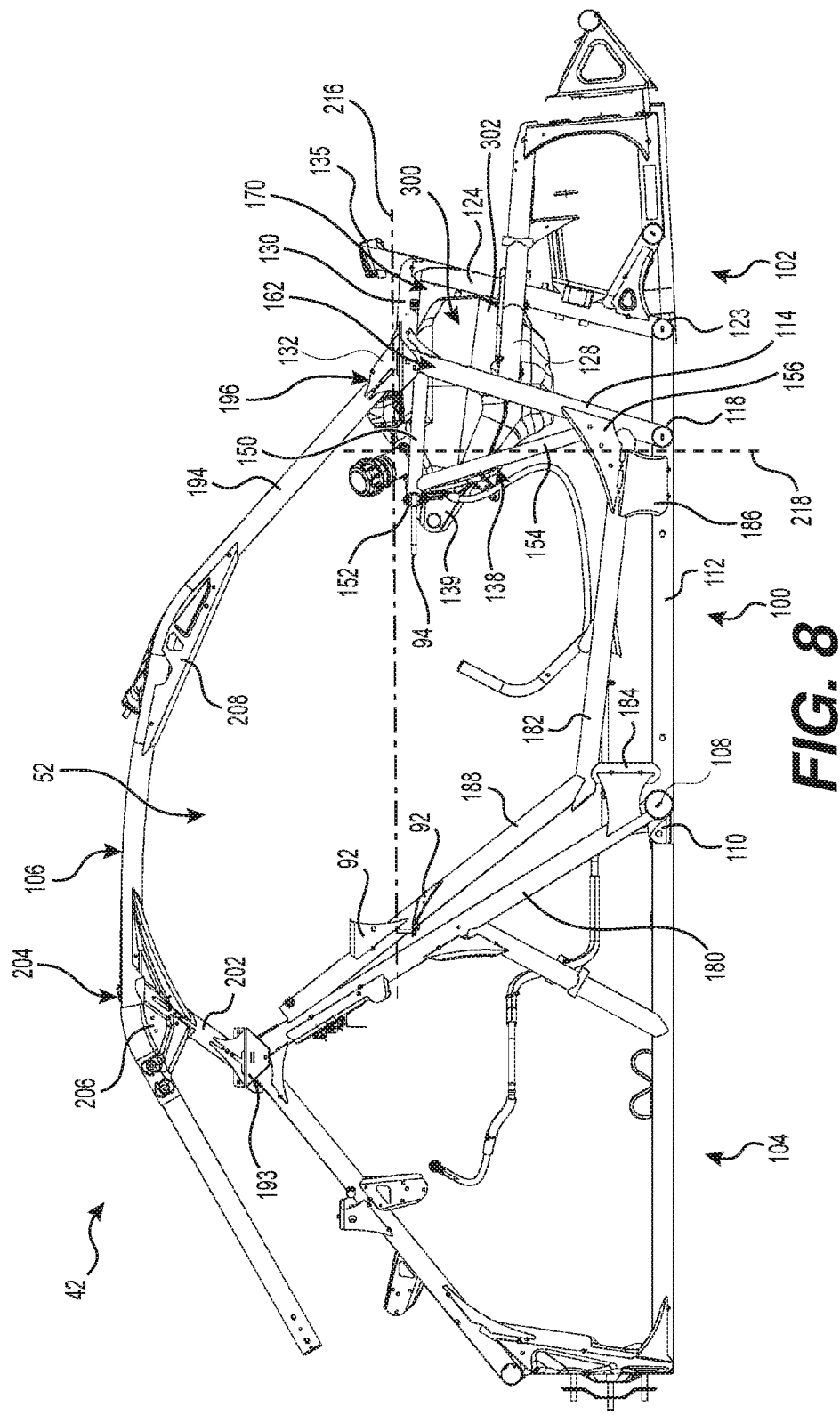
FIG. 8 is a right side elevation view of the frame of FIG. 7.
Figure 9:
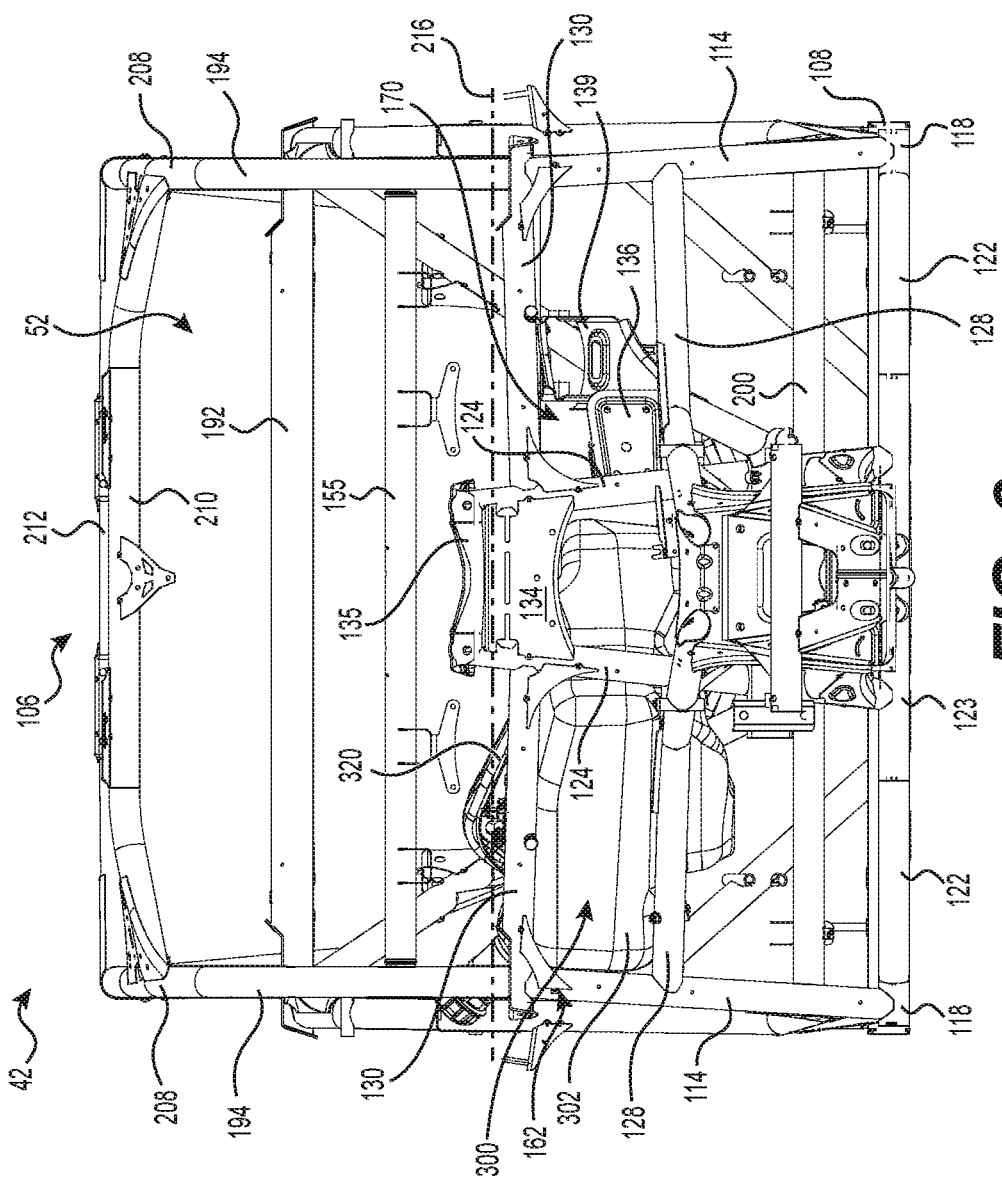
FIG. 9 is a front side elevation view of the frame of FIG. 7.
Figure 13:
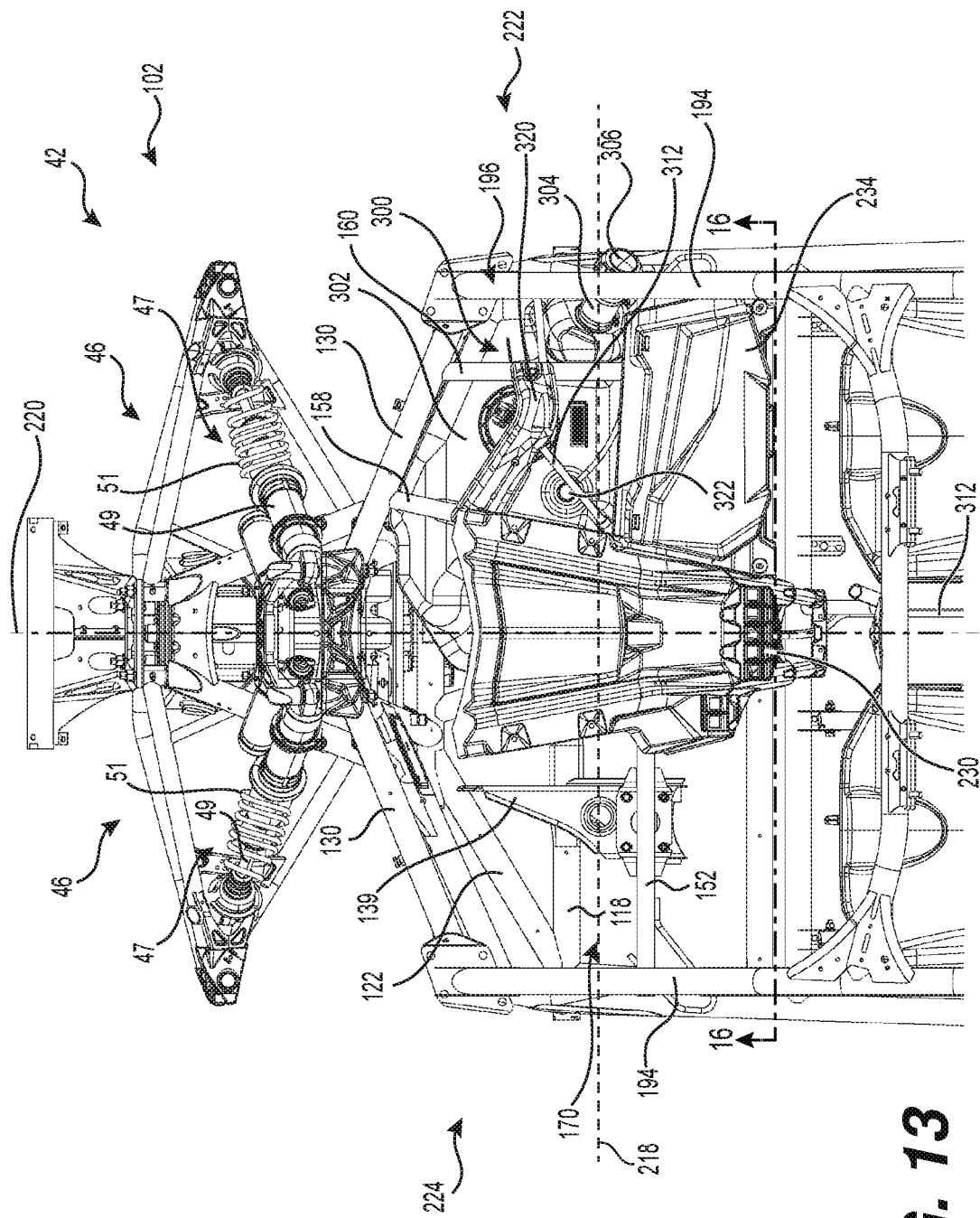
FIG. 13 is a close-up view of section 13 of FIG. 12.

The frame structure 138 is composed of a plurality of members. Generally horizontal members 150 are connected to the top ends of the generally vertical members 114 and extend upward and rearward therefrom. A laterally extending top member 152 extends between the rear ends of the generally horizontal members 150, above the bracket 139. Generally vertical members 154 extend downward from the rear ends of the generally horizontal members 150 and connect to brackets 156. The brackets 156 connect the bottom ends of the generally vertical members 154 to the generally vertical members 114. As best seen in FIGS. 7 and 8, on either side of the frame 42, the generally horizontal member 150 and the generally vertical members 114, 124 are disposed so as to form a triangle. As best seen in FIG. 13, generally horizontal members 158, 160 extend between the member 130 that is disposed on the right side of the frame structure 138 and the laterally extending top member 152, and are connected thereto. To summarize, the frame structure 138 is composed of the members 150, 152, 154, 158 and 160.

An intermediate area 170 of the frame 42 is defined between the cockpit area 52 and the front suspension module 102. The cockpit module 100 includes at least a portion of the intermediate area 170, as it is contemplated that the intermediate area 170 could be defined by one or more members of the front suspension module 102. The intermediate area 170 is defined between the frame structure 138, the members 114, 122, 123, 124, 128 and 130, and the brackets 132, 134 and 156 forming the barrier at the front of the cockpit module 100. In other words, the intermediate area 170 is defined between the members 114, 118, 122, 123, 124, 128, 130, 150, 152, 154, 158 and 160 of the frame 42. As such, the front suspension module 102 of the frame 42 and the front suspension assemblies 46 connect to one or more of the members of the frame 42 defining the intermediate area 170. As can be seen from FIGS. 7 to 11, the members 114, 118, 122, 123, 124, 128, 130, 150, 152, 154, 158 and 160 of the frame 42 are disposed forward of the seats 54, 56.

Figure 12:
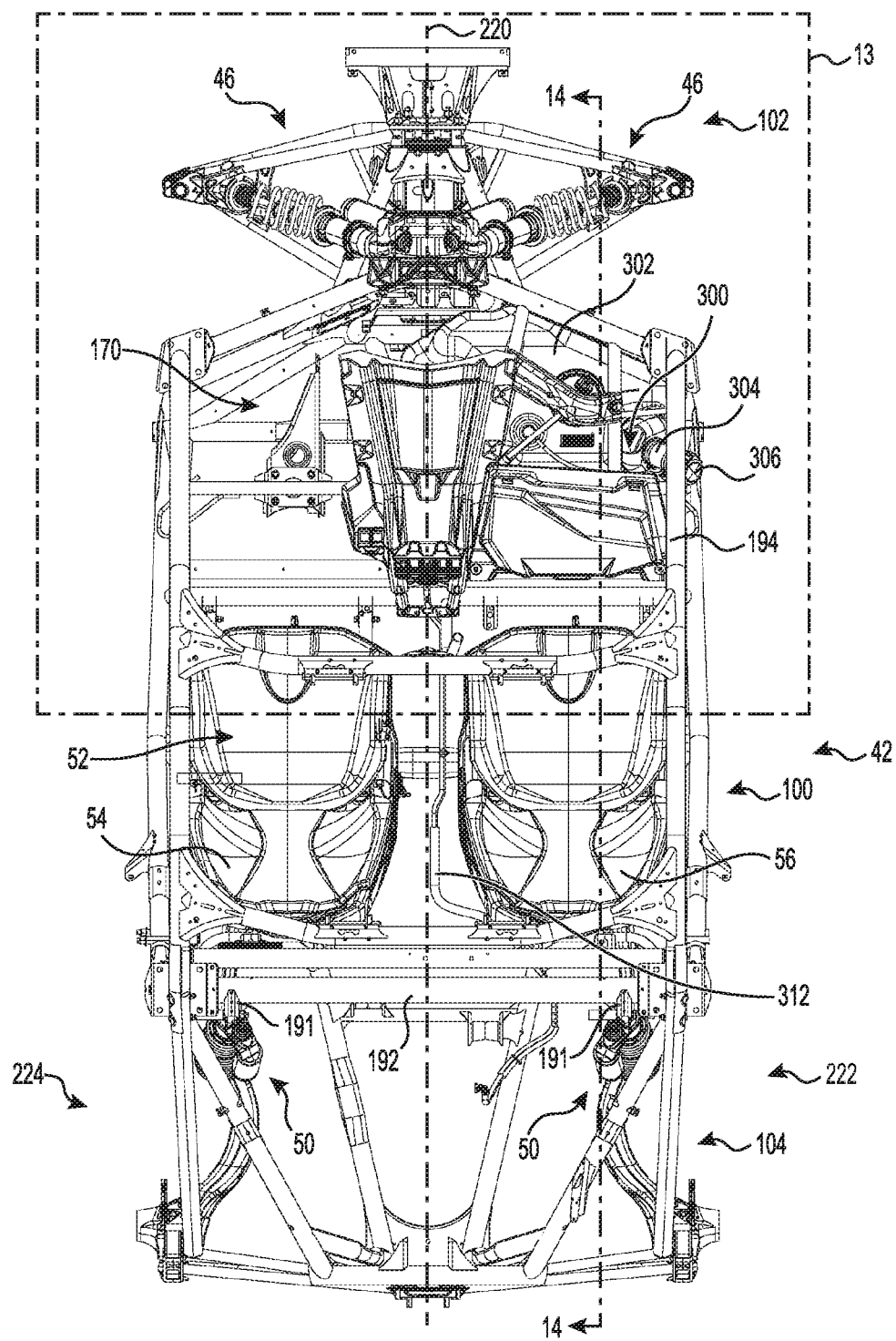
FIG. 12 is a top plan view of the components of FIG. 11.
Figure 14:
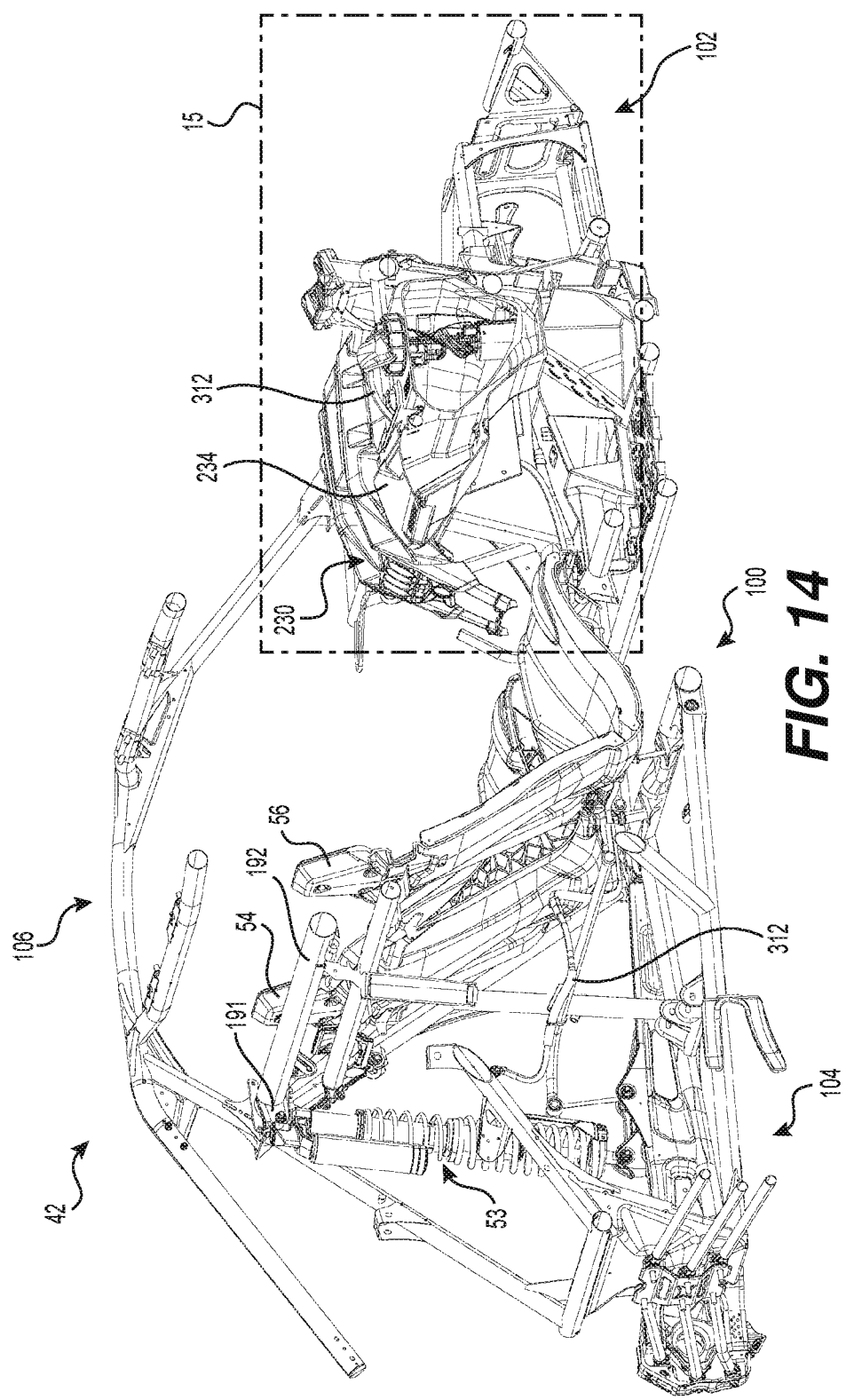
FIG. 14 is a perspective view taken from a rear right side of a cross-section of the components of FIG. 11 taken along line 14-14 of FIG. 12.

Rearward of the intermediate area 170, the cockpit area 52 is defined by a plurality of members of the frame 42 that will be briefly described. Rear members 180 extend upward and rearward from the ends of the bottom member 108. Side members 182 are connected to and extend upward and rearward from the vertical members 114. Cross-members 184 extend between and are connected to the rear portions of the bottom members 112 and of the side members 182. Each side member 182 and its corresponding bottom member 112 is provided with a bracket 186 extending between and connected to the front portions of the members 182, 112. Side members 188 are connected to the upper portion of the rear members 180. From the rear members 180, the side members 188 extend downward and forward and connect to the rear ends of the side members 182. The brackets 156 connect the front portions of the side members 182 to the generally vertical members 114, 154. A laterally extending member 192 is connected to the top ends of the rear members 180. Brackets 191 are connected to the laterally extending member 192. The rear shock absorber assemblies 53 of the left and right rear suspension assemblies 50 are pivotally connected at their upper ends to the brackets 191 (FIGS. 12 and 14). Brackets 193 are connected to the top of notches formed in the ends of the member 192. Longitudinal legs 194 of the roll cage 106 are connected at their front ends 196 to the brackets 132. Another laterally extending member 195 is connected between the rear members 180 below the laterally extending member 192. As best seen in FIG. 10A, a laterally extending member 200 extends between and connects to the side member 182 such that the member 200 is vertically spaced from and parallel to the bottom member 116. The brackets 198 are connected to the member 200 and are used to fasten the seats 54, 56 to the cockpit module 100 of the frame 42. To summarize, the cockpit area 52 is defined between the members 108, 112, 116, 118, 150, 152, 154, 180, 182, 184, 188, 192 and 195, below the roll cage 106.

Referring to FIGS. 7 to 10A, the roll cage 106 of the frame 42 will be briefly described. The roll cage 106 is connected at its rear to the brackets 193. Legs 202 are connected to and extend upward and forward from the brackets 193. The upper ends of the legs 202 are received in and connected to connectors 206. Upper portions 204 of the longitudinal legs 194 are received in and connected to the connectors 206. As best seen in FIG. 10A, the longitudinal legs 194 are bent near their center points. Brackets 208 are provided at the bend in the longitudinal legs 194. A front cross-member 210 is connected to and extends between the longitudinal legs 194. A rear cross-member 212 is connected to and extends between the longitudinal legs 194. The cross-member 212 is disposed rearward of the cross-member 210. The cross-member 210 is connected to the longitudinal legs 194 in their upper portion 204 through the bracket 206. It is contemplated that the roll cage 106 could be defined by one or more members of the front suspension module 102 or of the rear suspension module 104. As can be seen in FIGS. 10A and 10B, the roll cage 106 is disposed over the cockpit area 52 and at least a portion of the intermediate area 170 of the frame 42.

Referring to FIGS. 8 to 17C, the fuel tank assembly 300, its positioning and its connection with respect to the frame 42 of the vehicle 40 will be described in more detail. The fuel tank assembly 300 includes a fuel tank 302. In the present implementation, the fuel tank 302 is disposed in the intermediate area 170 of the frame 42 and above the floor of the cockpit area 52. As best seen in FIG. 10A, the fuel tank 302 is disposed in the area defined between the members 114, 118, 122, 123, 124, 128, 130, 150, 152, 154, 158 and 160. Especially, the members 114, 124, 128, 130, 150, 152, 154, 158 and 160 are proximate to the fuel tank 302 as the members 114, 118, 122, 123, 124, 128, 130, 150, 152, 154, 158 and 160 define an area that is slightly larger than the fuel tank 302. Referring to FIGS. 8 to 10A, at least a portion of the members 114, 118, 122, 123, 124, 128, 130, 150, 152, 154, 158 and 160 form a cage 162. The fuel tank 302 is housed in the cage 162. It is contemplated that the fuel tank 302 could be disposed at other locations forward of the seats 54, 56. More specifically, it is also contemplated that the fuel tank 302 could be disposed at other locations forward of the cockpit area 52 and rearward of a front end of the frame 42.

Referring to FIGS. 8 to 10A, the position of some of the members of the frame 42 forming the cage 162 will be described with respect to the fuel tank 302. The members that are referred to in this paragraph are the members that are disposed on the right side of the vehicle 40. The generally vertical member 114 extends to the right of a front right edge of the fuel tank 302. The generally vertical member 124 extends in front of a front left edge of the fuel tank 302. The generally horizontal member 128 extends in front of a front bottom edge of the fuel tank 302. The generally horizontal member 130 extends in front of a front top edge of the fuel tank 302. The generally horizontal member 150 extends to the right of a top right edge of the fuel tank 302. The laterally extending top member 152 extends at the rear of a top rear edge of the fuel tank 302. The generally vertical member 154 extends to the right of a rear right edge of the fuel tank 302. The generally horizontal members 158, 160 extend above a top face of the fuel tank 302.

Referring to FIG. 8, at least a majority of the fuel tank 302 is disposed rearward of the suspension module 102 of the frame 42. It is contemplated that the fuel tank 302 could be disposed completely rearward of the suspension module 102. The fuel tank 302 is disposed completely rearward of the front suspension assemblies 46 (FIG. 11). The fuel tank 302 is disposed completely forward of the rear suspension module 104. A majority of the fuel tank 302 is also disposed under the roll cage 106, more specifically below the longitudinal legs 194 thereof. In addition, at least a portion of the fuel tank 302 is disposed under a projection of the roll cage 106 onto a horizontal plane 216 as would be understood from FIGS. 8, 9 and 10B.

Referring to FIGS. 10B to 13, the vehicle 40 has a longitudinal centerline 220. The right side of the longitudinal centerline 220 corresponds to a passenger side 222 of the vehicle 40, while the left side of the longitudinal centerline 220 corresponds to a driver side 224 of the vehicle 40. A majority of the fuel tank 302 is disposed on the passenger side 222 of the vehicle 40. It is contemplated that a fuel tank 302 having a smaller width than the one shown in the present implementation could be disposed completely on the passenger side 222 of the vehicle 40. The fuel tank 302 is disposed forward of the passenger seat 56. The fuel tank 302 is disposed forward and rightward of the driver seat 54.

Figure 10C:
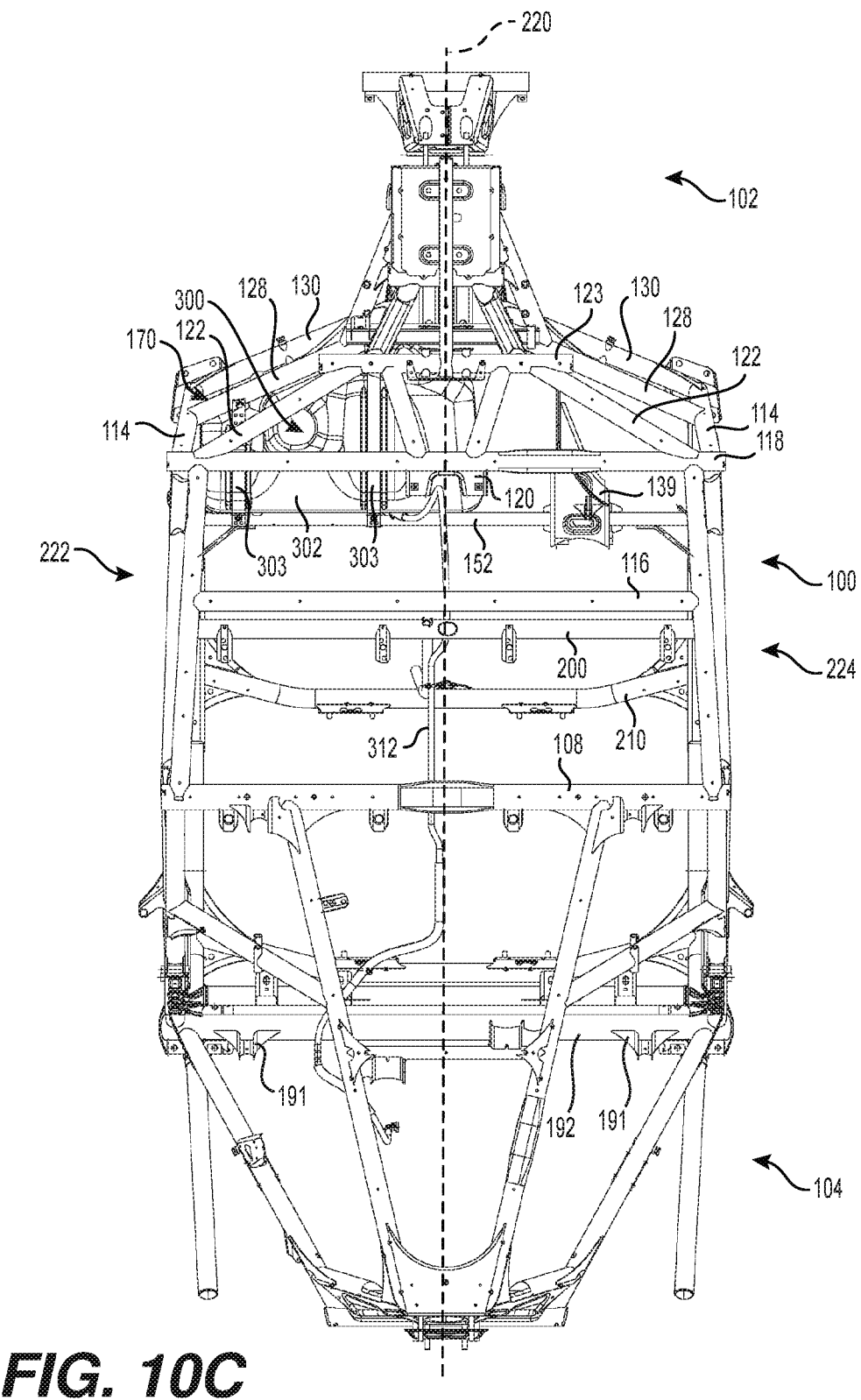
FIG. 10C is a bottom plan view of the frame of FIG. 7.

Referring to FIG. 10C, the fuel tank 302 is connected to the frame 42 using two straps 303. Each strap 303 is connected at a front end to the member 128 and at a rear end to the member 152. Each strap 303 passes under the bottom face of the fuel tank 302 and at the rear of the rear face of the fuel tank 302. When the straps 303 are connected to the members 128 and 152, the fuel tank 302 is pushed upwardly until the top face of the fuel tank 302 contacts one or more members of the intermediate area 170 of the frame 42, including the members 158 and 160 that extend above the top face of the fuel tank 302. It is contemplated that the fuel tank 302 could be connected to one or more members of the frame 42 using at least one bracket used in combination with the straps 303.

The fuel tank assembly 300 further has a filler neck 304 that is connected to the fuel tank 302. The filler neck 304 is selectively closed by a cap 306. The filler neck 304 extends upward, rightward and rearward from a top, right and rear portion of the fuel tank 302. It is contemplated that the filler neck 304 could extend upward and forward from the top portion of the fuel tank 302. The filler neck 304 extends vertically higher than the bracket 132 and the front end 196 of the longitudinal leg 194 disposed on the passenger side 222. In addition, the filler neck 304 is disposed rearward of the front end 196 of the longitudinal leg 194 disposed on the passenger side 222. The filler neck 304 and the cap 306 are covered by the side panel 77 disposed on the passenger side 224 of the vehicle 40 as would be understood from FIGS. 1 to 3 and 9 to 11. In other words, the side panel 77 is disposed over the filler neck 304 and the cap 306. The side panel 77 is selectively connected to or removed from the frame 42 so as to prevent or allow access to the filler neck 304 and/or the cap 306, respectively. It is contemplated that the side panel 77 could be pivotally connected to the frame 42 and/or could be replaced two or more body panels. It is also contemplated that the side panel 77 could be provided with an aperture so as to allow access to the filler neck 304 and/or the cap 306 without having to remove or pivot the side panel 77.

Figure 15:
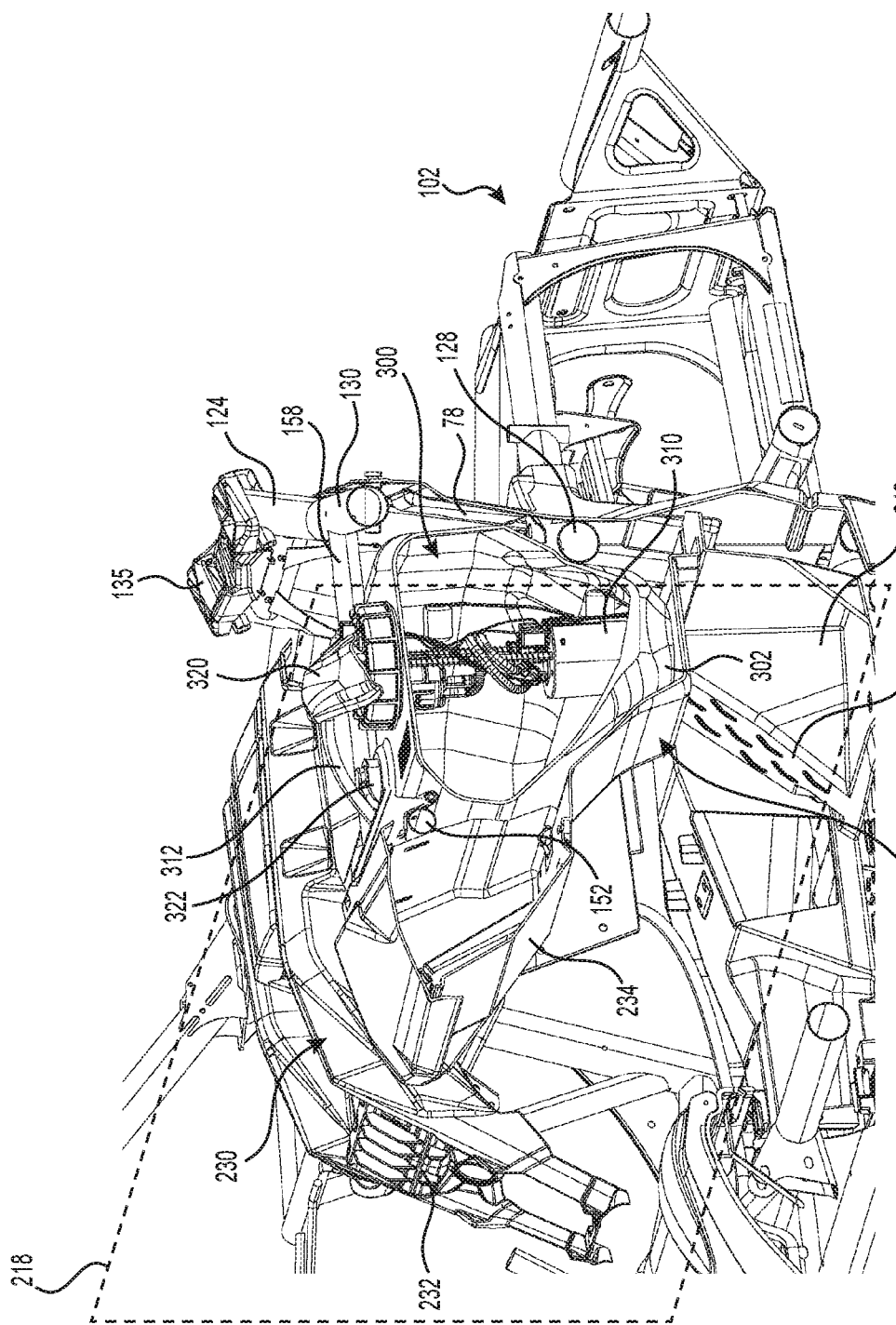
FIG. 15 is a close-up view of section 15 of FIG. 14.

Referring to FIGS. 14 and 15, the fuel tank assembly 300 further has a fuel pump 310 that is inserted inside the fuel tank 302 through a top of the fuel tank 302. The fuel pump 310 is fluidly connected to the fuel tank 302. It is contemplated that the fuel pump 310 could be outside of the fuel tank 302 and connected to the frame 42. The fuel tank assembly 300 further has a fuel line 312 that is fluidly connected to the fuel pump 310. It is contemplated that the fuel line 312 could be made of one or more hoses and connectors suitable for handling fuel such as gasoline. The fuel line 312 fluidly communicates the fuel tank 302 with the engine 62 for delivering fuel from the fuel tank 302 to the engine 62. As best seen in FIG. 12, the fuel line 312 passes between the driver and passenger seats 54, 56. It is contemplated that the fuel line 312 could pass under one of the driver and passenger seats 54, 56, or inside one or more of the hollow members composing the frame 42 of the vehicle 40.

The fuel tank assembly 300 further includes a bracket 320 connected to the members 158, 160 of the frame 42. The bracket 320 extends over a portion of the fuel line 312 that is connected to the fuel pump 310. The fuel tank assembly 300 further has a fuel level sensor (not shown) that is operatively connected to the fuel tank 302. The fuel level sensor is electronically connected to a control unit (not shown) of the vehicle 40. The control unit of the vehicle 40 sends a signal to the fuel gauge that is provided in the cluster of gauges 60 in order to display the fuel level in the fuel tank 302. The fuel tank assembly 300 further has a vent 322. The vent 322 includes a valve that is configured to allow air to flow in and out of the fuel tank 302. The valve is configured to prevent the fuel from flowing out of the fuel tank 302 in the event the vehicle 40 is tilted to an angle that is more than a predetermined angle.

Figure 16:
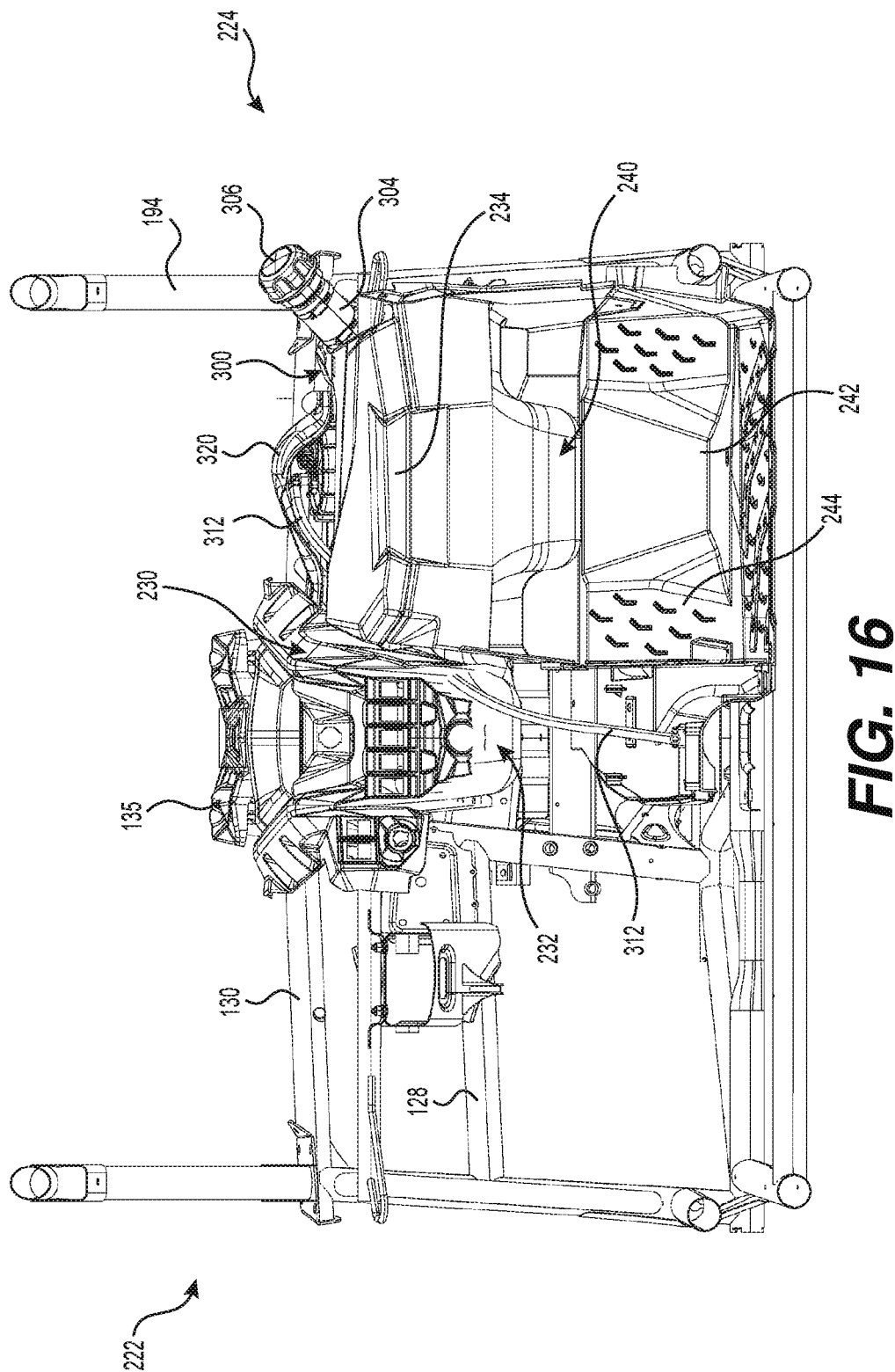
FIG. 16 is a cross-sectional view of the components of FIG. 11 taken along line 16-16 of FIG. 13.

Referring to FIGS. 11 to 17C, a dashboard 230 is connected to the members of the frame 42. More specifically, the dashboard 230 is connected to the laterally extending top member 152. The dashboard 230 is disposed rearward and over the intermediate area 170 of the frame 42. The dashboard 230 has a central portion 232 including a plurality of panels and switches. The switches are configured for operating various systems of the vehicle 40, such as the lighting system that turns on or off the headlights 72. A segment of the fuel line 312 passes behind the central portion 232 of the dashboard 230 as best seen in FIGS. 16 and 17A. The dashboard 230 also includes a storage box 234 disposed on the passenger side 222 of the vehicle 40, in front of the passenger seat 56. As can be seen in FIGS. 15 to 17A, the fuel tank 302 is disposed in front of the storage box 234 and at least a portion of the fuel tank 302 is at the same vertical level as a portion of the storage box 234. Below the storage box 234, the dashboard 230 defines part of a cockpit front wall 240. The cockpit front wall 240 defines a foot well 242 and two foot rests 244. The fuel tank 302 is disposed above the foot well 242 and the foot rests 244. The fuel tank 302 has a lower surface 307 including left and right portions 302a and a central portion 302b. The central portion 302b extends vertically lower than the left and right portions 302a and defines a cavity 308 such that fuel located within the cavity 308, between the left and right portions 302a, is lower than the fuel located above the portions 302a. Portions 302a of the fuel tank 302 are disposed directly above the foot well 242 and the left and right foot rests 244.

Figure 17A:
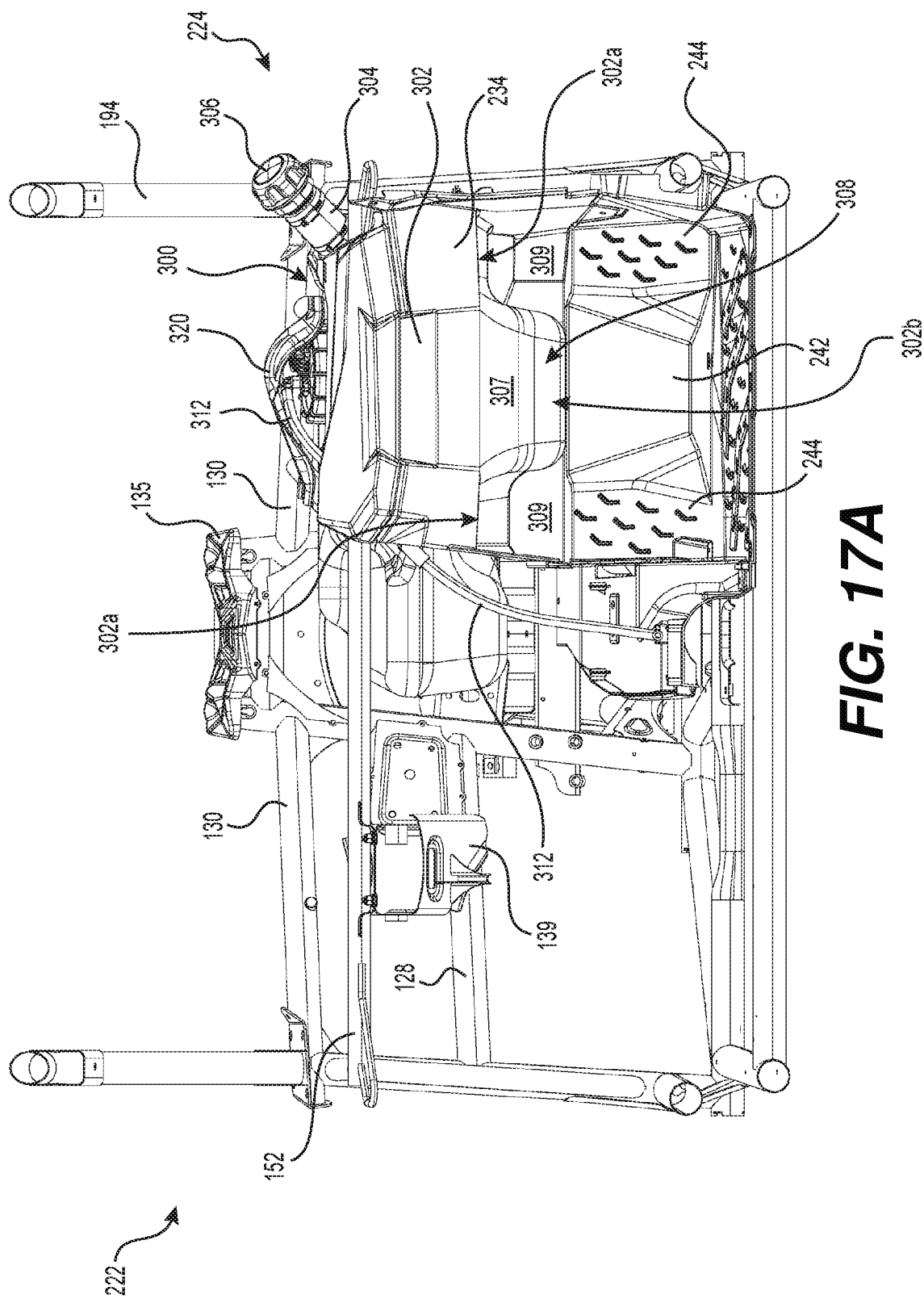
FIG. 17A is a cross-sectional view of the components of FIG. 11 taken along line 16-16 of FIG. 13, with a portion of the dashboard removed.
Figure 17B:
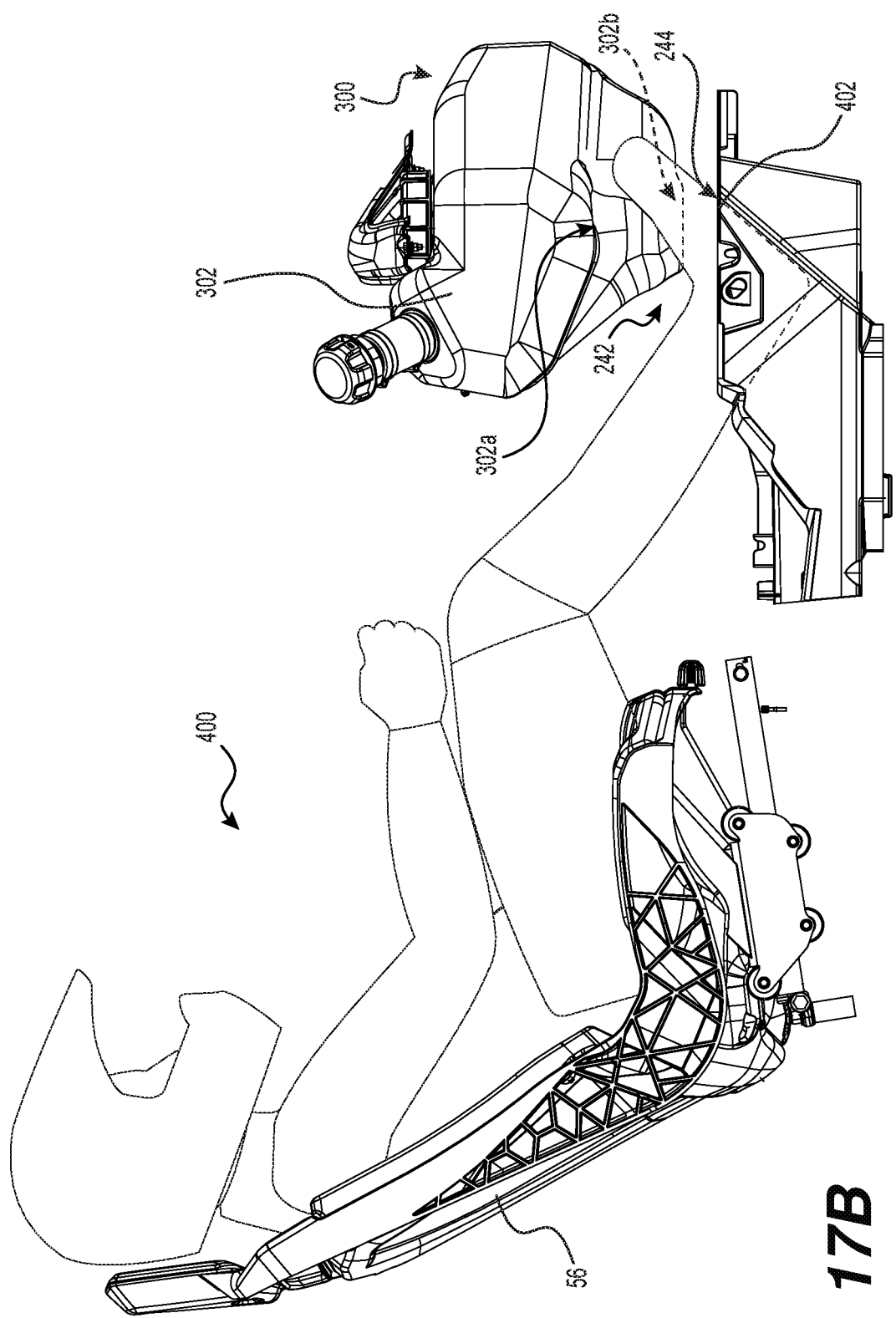
FIG. 17B is a right side elevation view of the passenger seat, the fuel tank assembly and the foot rest of the vehicle of FIG. 1, with a passenger sitting on the passenger seat.
Figure 17C:
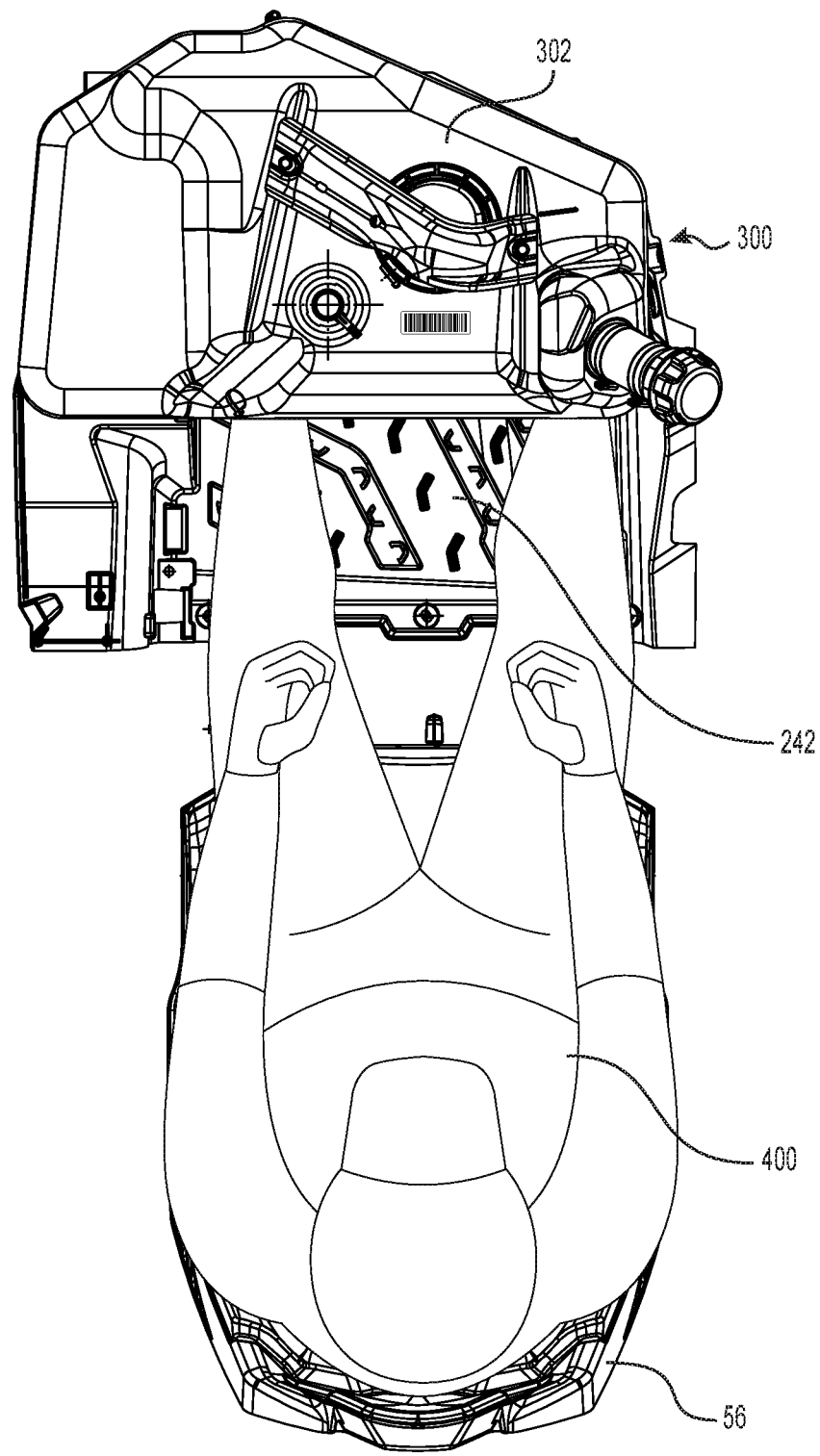
FIG. 17C is a top plan view of the passenger, the passenger seat, the fuel tank assembly and the foot rest of FIG. 17B.
Figure 18:
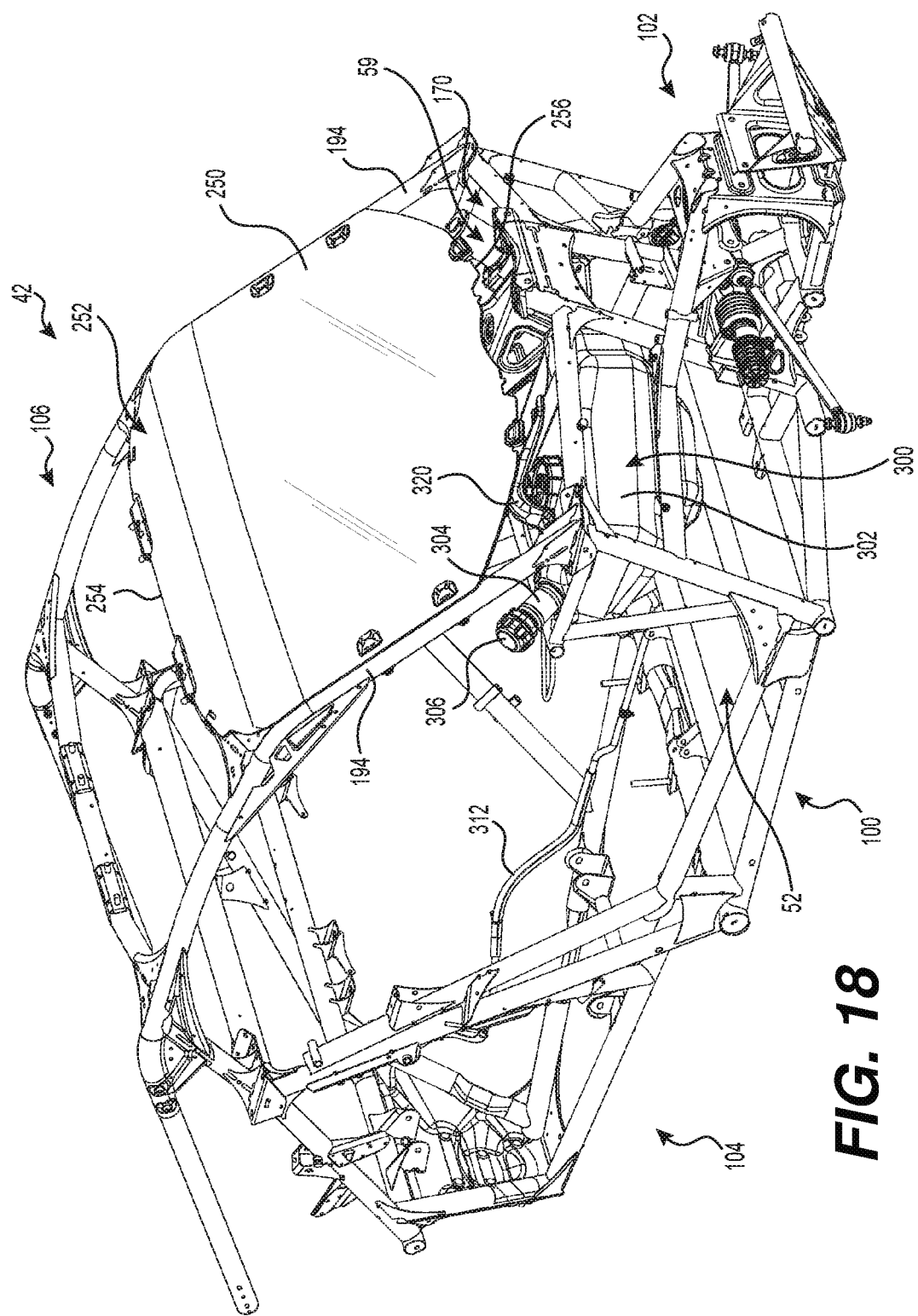
FIG. 18 is a perspective view of the frame of FIG. 7 taken from a front, right side, with a windshield connected to the frame.
Figure 19:
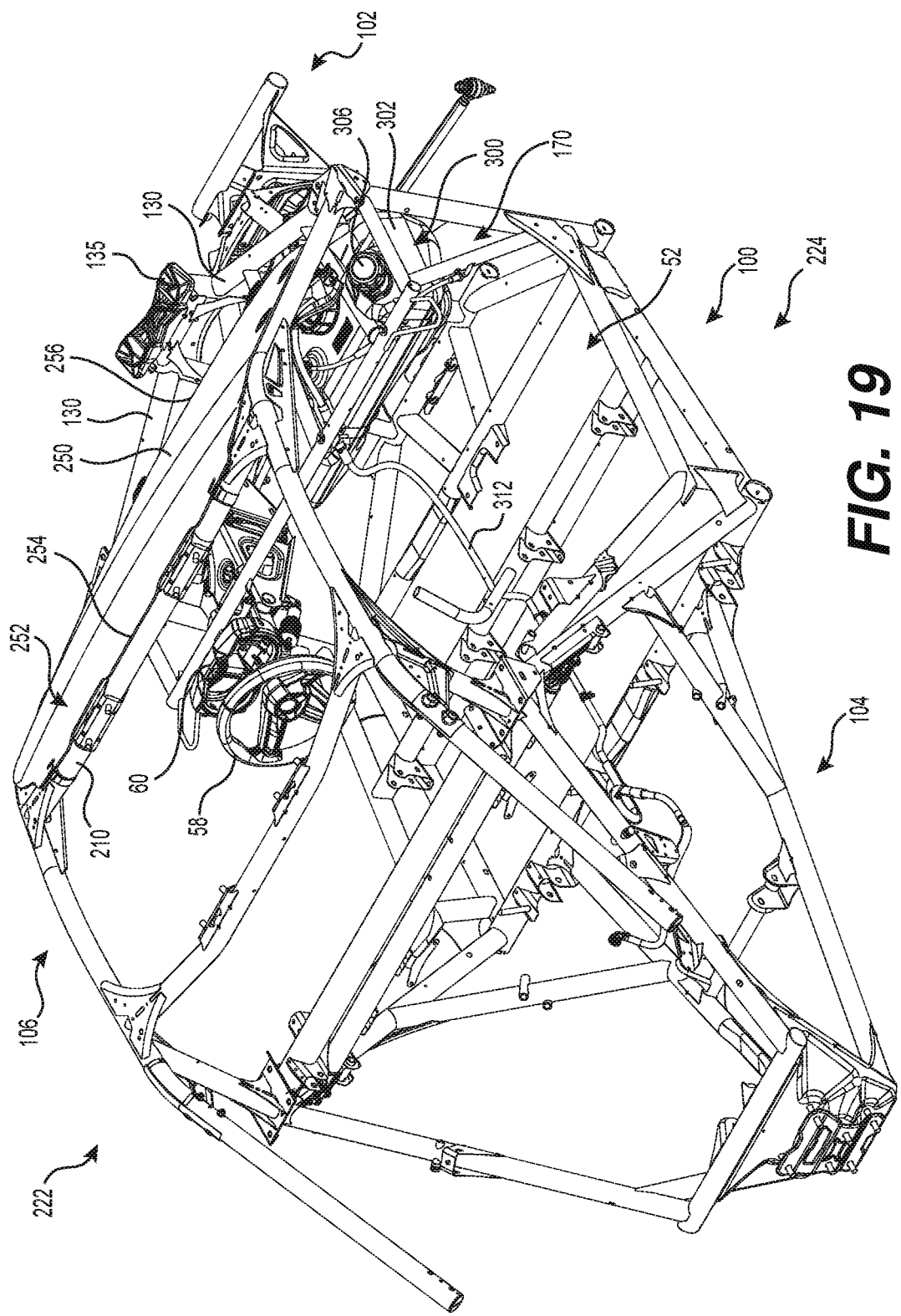
FIG. 19 is a perspective view of the components of FIG. 18 taken from a rear, right side.

Referring to FIGS. 17A to 17C, the left and right portions 302a of the fuel tank 302 define recesses 309 above the foot rests 244 to accommodate the tip of the feet 402 of a passenger 400 sitting on the passenger seat 56 and resting his feet 402 on the foot rests 244. As seen in FIG. 17B, the central portion 302b is between the feet 402 of the passenger 400 sitting on the passenger seat 56 and resting his feet 402 on the foot rests 244.

As would be understood from FIGS. 8 and 13 to 15, a laterally extending vertical plane 218 intersects the foot well 242, the foot rests 244 and the fuel tank 302. As best seen in FIG. 15, the fuel tank 302 is disposed forward of the cockpit front wall 240 and rearward of the front fender wall 78 disposed on the passenger side 224 of the vehicle 40. As such, the fuel tank 302 is disposed longitudinally between the cockpit front wall 240 and the front fender wall 78. It is contemplated that in some implementations the cockpit front wall 240 could be omitted, in which case the fuel tank 302 would be disposed rearward of the fender wall 78 and forward of the seats 54, 56. As would be understood from FIGS. 2, 5, 6, 15 and 21, the power steering motor assembly 59 is disposed between the front fender wall 78 that is on the driver side 222 of the vehicle 40 and the dashboard 230. The power steering motor assembly 59 is connected to the bracket 139. It is contemplated that the power steering motor assembly 59 could be further connected to one or more of the members of the frame 42.

Figure 20:
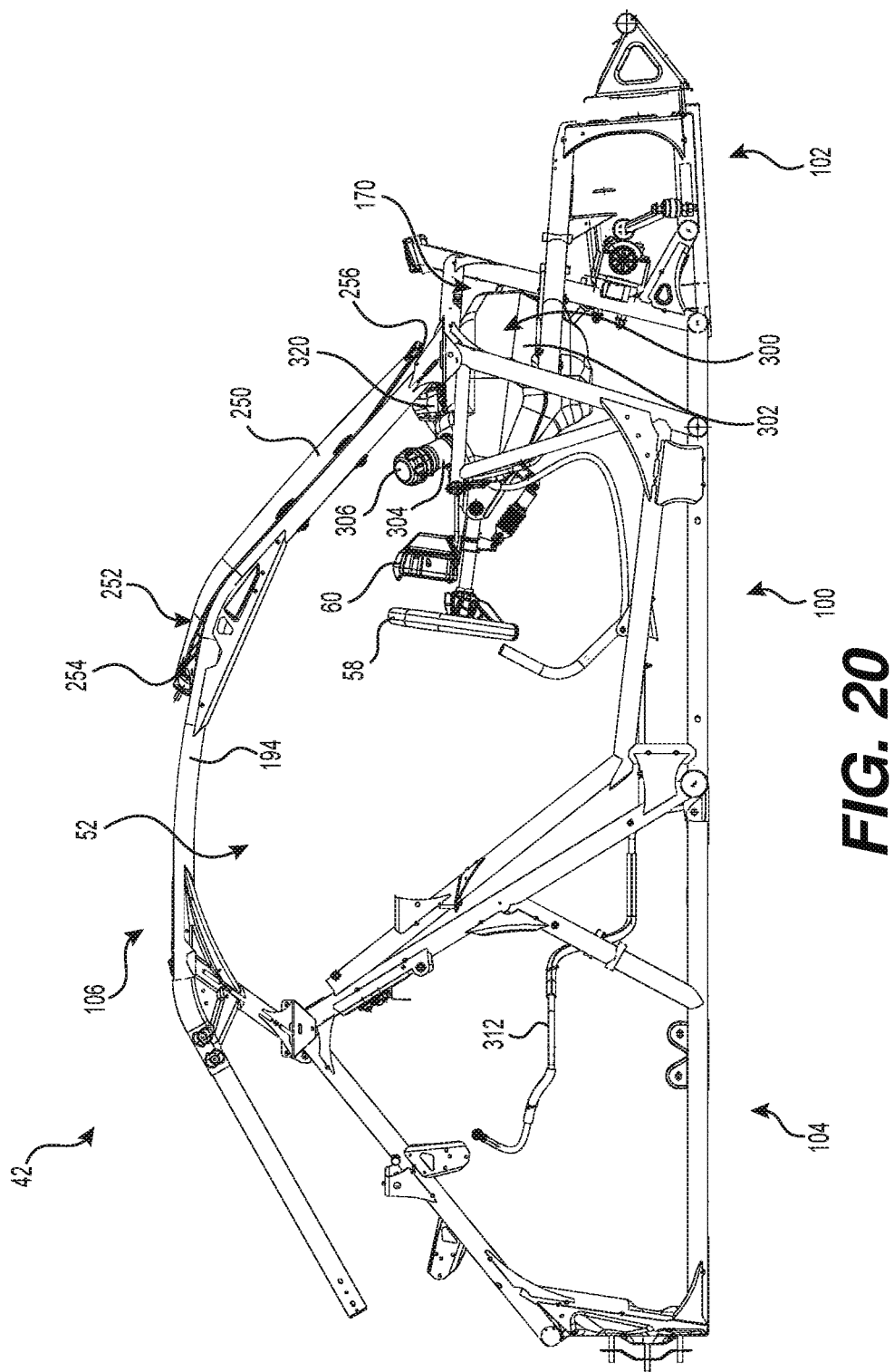
FIG. 20 is a right side elevation view of the components of FIG. 18.
Figure 21:
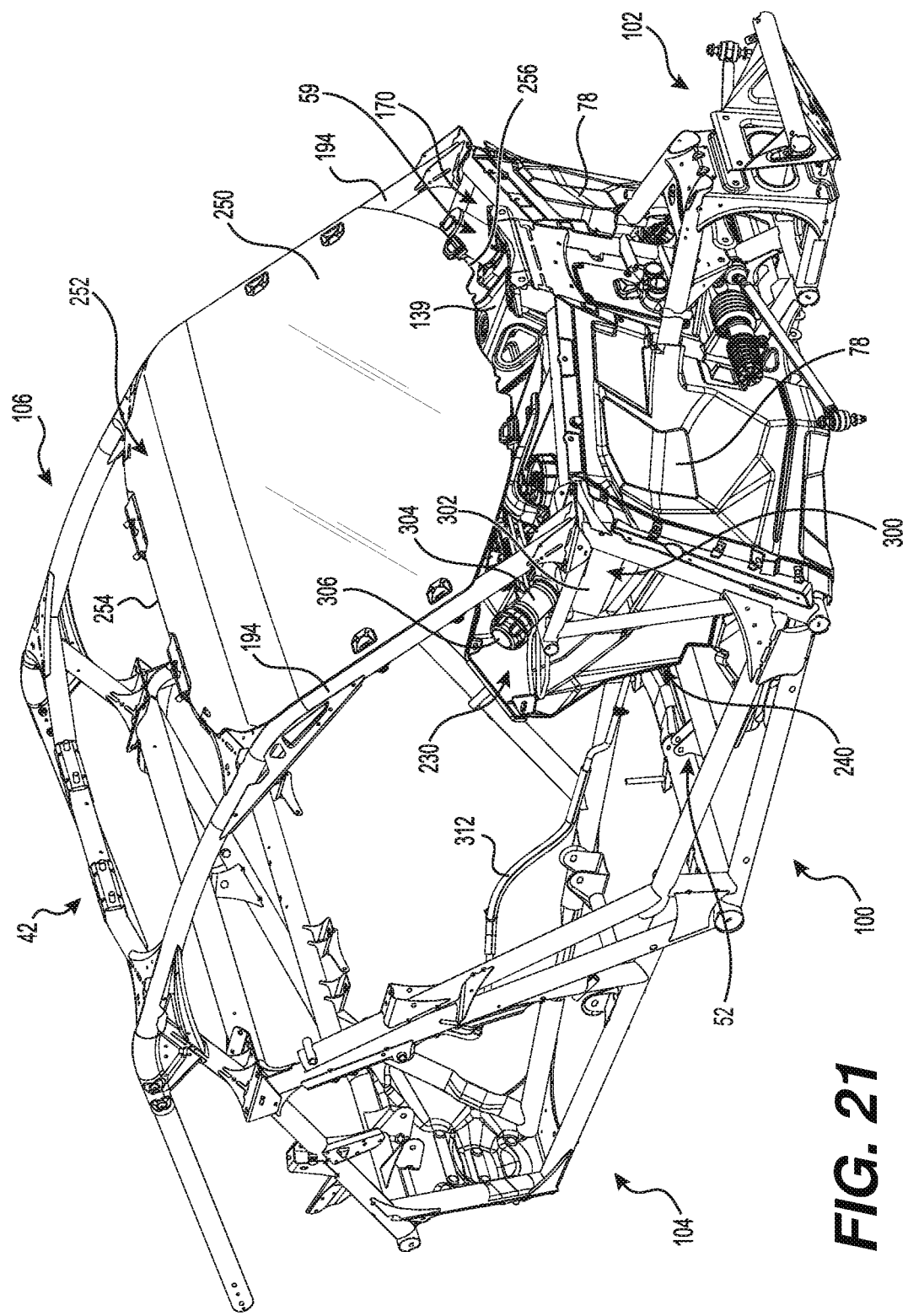
FIG. 21 is a perspective view of the components of FIG. 18 taken from a front, right side, with the dashboard and the left and right fender walls connected thereto.
Figure 22:
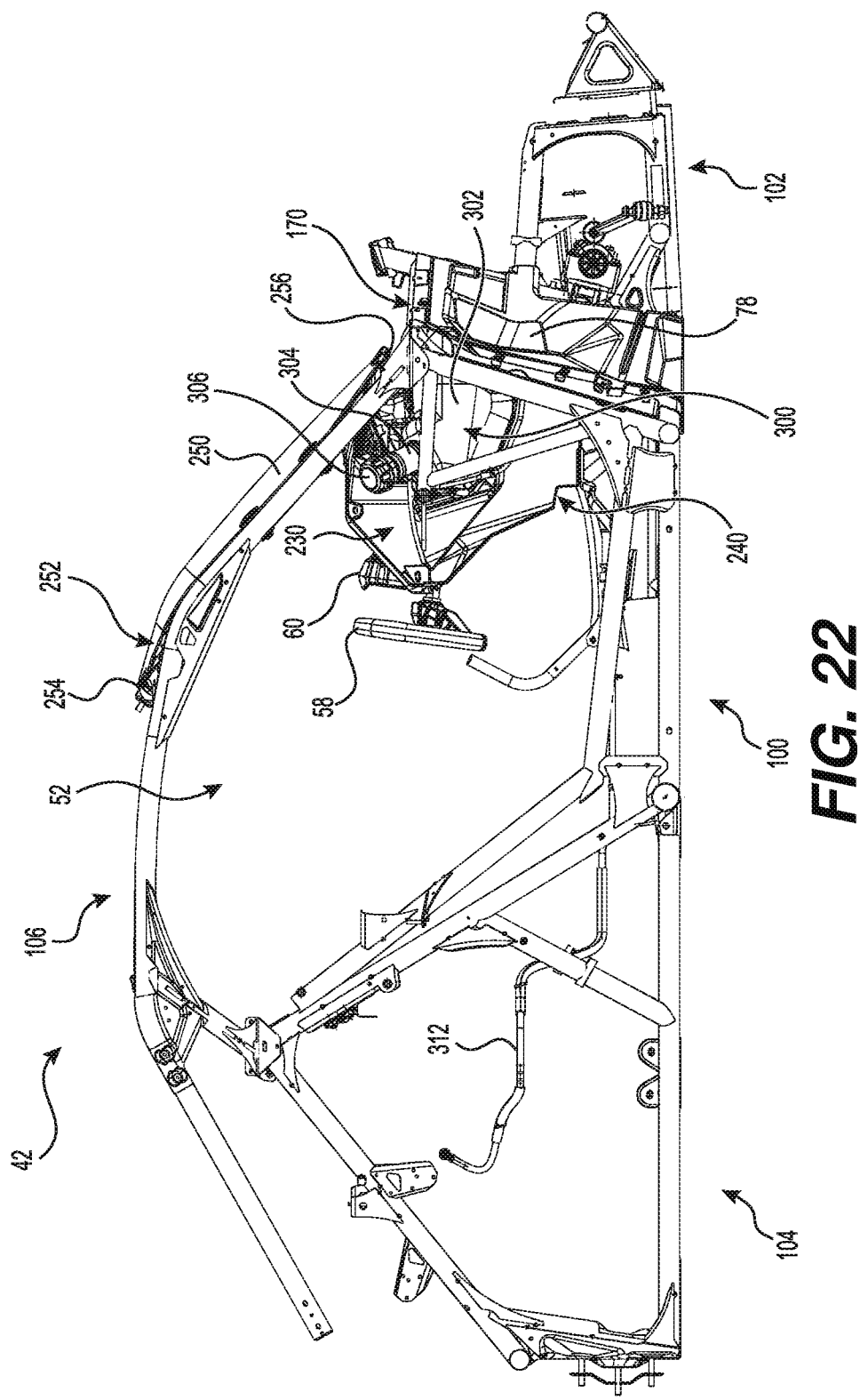
FIG. 22 is a right side elevation view of the components of FIG. 21.

Referring to FIGS. 18 to 22, the vehicle 40 is provided with a windshield 250 that is connected to the roll cage 106. More particularly, an upper portion 252 of the windshield 250 is connected to the cross-member 210 of the roll cage 106. It is contemplated that the windshield 250 could be pivotally connected to the cross-member 210 of the roll cage 106. It is also contemplated that the vehicle 40 could be used without the windshield 250, as presented in FIG. 1. The windshield 250 extends laterally between the longitudinal legs 194 of the roll cage 106. The windshield 250 is disposed forward of the cockpit area 52. The windshield 250 has a top edge 254 and a bottom edge 256. The fuel tank 302 is disposed below and completely forward of the top edge 254 of the windshield 250. The bottom edge 256 of the windshield 250 is disposed above the intermediate area 170 of the frame 42. As best seen in FIG. 20, at least a majority of the fuel tank 302 is disposed below and rearward of the bottom edge 256 of the windshield 250. It is contemplated that the fuel tank 302 could be disposed completely below and rearward of the bottom edge 256 of the windshield 250.

Referring to FIG. 6, a line 260 passing through points 262 and 264 is disposed above the shoulder generally indicated by curve 266 around which the seat belt 61 passes when a driver of the vehicle 40 sits in the driver seat 54 in its rearmost position as shown with his back firmly against the back of the driver seat 54. The curve 266 contains the shoulder reference point as defined in SAE J826 (as revised in November 2008), the entirety of which is incorporated herein by reference. The point 262 is the point at the intersection of a pivot axis 268 of the rear shock absorber assembly 53 and the centerline 270 of the shock absorber 55 of the rear suspension assembly 50. The point 262 defines an upper connection point of the rear shock absorber assembly 53 to the frame 42. The point 264 is the point at the intersection of an upper pivot axis 272 of the front shock absorber assembly 47 and the centerline 274 of the shock absorber 49 of the front suspension assembly 46. The point 264 defines an upper connection point of the front shock absorber assembly 47 to the frame 42. The fuel tank 302 is disposed below the line 260. The intermediate area 170 of the frame 42 and the cage 162 are also disposed below the line 260.

The vehicle 40, the frame 42, and the fuel tank assembly 300 implemented in accordance with some non-limiting implementations of the present technology can be represented as presented in the following numbered clauses.

CLAUSE 1: A vehicle (40) comprising: a frame (42) defining a cockpit area (52), the frame (42) comprising a roll cage (106) disposed over the cockpit area (52); a driver seat (54) connected to the frame (42) and being disposed in the cockpit area (52); a passenger seat (56) connected to the frame (42) and being disposed in the cockpit area (52), the passenger seat (56) being disposed beside the driver seat (54); an engine (62) connected to the frame (42); a plurality of ground engaging members (44, 48) operatively connected to the frame (42), at least one ground engaging member (44, 48) of the plurality of ground engaging members (44, 48) being operatively connected to the engine (62); and a fuel tank assembly (300) comprising a fuel tank (302) connected to the frame (42), the fuel tank (302) being forward of the seats (54, 56), and at least a portion of the fuel tank (302) being disposed under the roll cage (106).

CLAUSE 2: The vehicle (40) of clause 1, wherein a majority of the fuel tank (302) is disposed under the roll cage (106).

CLAUSE 3: The vehicle (40) of clause 1 or 2, wherein the frame (42) further comprises: a cockpit module (100) comprising: the cockpit area (52); and the roll cage (106); a front suspension module (102) disposed forward of the cockpit module (100) and connected thereto, at least a majority of the fuel tank (302) being disposed rearward of the front suspension module (102); and a rear suspension module (104) disposed rearward of the cockpit module (100) and connected thereto, the fuel tank (302) being disposed completely forward of the rear suspension module (104), and the engine (62) being disposed rearward of the cockpit area (52) in the rear suspension module (104).

CLAUSE 4: The vehicle (40) of clause 3, further comprising: a front shock absorber assembly (47) pivotally connected to the frame (42) at a first upper connection point (264); and a rear shock absorber assembly (53) pivotally connected to the frame (42) at a second upper connection point (262); wherein the fuel tank (302) is disposed below a line (260) passing through the first and second upper connection points (264, 262) of the front and rear shock absorber assemblies (47, 53) to the frame (42).

CLAUSE 5: The vehicle (40) of any one of clauses 1 to 4, wherein the fuel tank (302) is disposed forward of the cockpit area (52) and rearward of a front end of the frame (42).

CLAUSE 6: The vehicle (40) of any one of clauses 1 to 5, wherein: the driver seat (54) is disposed on a first side of a longitudinal centerline (220) of the vehicle (40); the passenger seat (56) is disposed on a second side of the longitudinal centerline (220) of the vehicle (40); and a majority of the fuel tank (302) is disposed on the second side.

CLAUSE 7: The vehicle (40) of any one of clauses 1 to 6, wherein at least the portion of the fuel tank (302) is disposed under a projection of the roll cage (106) onto a horizontal plane (216).

CLAUSE 8: The vehicle (40) of any one of clauses 1 to 7, wherein: members (114, 118, 122, 123, 124, 128, 130, 150, 152, 154, 158, 160) of the frame (42) disposed forward of the seats (54, 56) form a cage (162); and the fuel tank (302) is housed in the cage (162).

CLAUSE 9: The vehicle (40) of any one of clauses 1 to 8, further comprising a fender wall (78) connected to the frame (42); and wherein the fuel tank (302) is disposed rearward of the fender wall (78).

CLAUSE 10: The vehicle (40) of any one of clauses 1 to 9, further comprising a cockpit front wall (240) connected to the frame (42), the cockpit front wall (240) being disposed forward of the passenger seat (56); and wherein the fuel tank (302) is disposed forward of the cockpit front wall (240).

CLAUSE 11: The vehicle (40) of any one of clauses 1 to 8, further comprising: a fender wall (78) connected to the frame (42); and a cockpit front wall (240) connected to the frame (42), the cockpit front wall (240) being disposed forward of the passenger seat (56) and rearward of the fender wall (78); wherein the fuel tank (302) is disposed longitudinally between the cockpit front wall (240) and the fender wall (78).

CLAUSE 12: The vehicle (40) of any one of clauses 1 to 11, wherein the fuel tank assembly (300) further comprises: a fuel pump (310) fluidly connected to the fuel tank (302);

and a fuel line (312) fluidly communicating the fuel tank (302) with the engine (62) for delivering fuel from the fuel tank (302) to the engine (62), the fuel line (312) passing between the driver and passenger seats (54, 56).

CLAUSE 13: The vehicle (40) of any one of clauses 1 to 12, wherein: the fuel tank assembly (300) further comprises a filler neck (304) connected to the fuel tank (302); the roll cage (106) comprises longitudinal legs (194) each having a front end (196); and the filler neck (304) is disposed rearward of the front ends (196) of the longitudinal legs (194) of the roll cage (106).

CLAUSE 14: The vehicle (40) of clause 13, wherein the filler neck (304) extends vertically higher than the front ends (196) of the longitudinal legs (194) of the roll cage (106).

CLAUSE 15: The vehicle (40) of clause 13 or 14, wherein the filler neck (304) extends upward, rightward and rearward from a top, right and rear portion of the fuel tank (302).

CLAUSE 16: The vehicle (40) of any one of clauses 13 to 15, further comprising: body panels connected to the frame (42); and at least one of the body panels is disposed over the filler neck (304).

CLAUSE 17: The vehicle (40) of any one of clauses 1 to 16, wherein the fuel tank (302) is disposed in front of the passenger seat (56).

CLAUSE 18: The vehicle (40) of clause 17, further comprising a foot well (242) and a foot rest (244) disposed in front of the passenger seat (56); and wherein the fuel tank (302) is disposed above the foot well (242) and the foot rest (244).

CLAUSE 19: The vehicle (40) of clause 18, wherein a portion (302a) of the fuel tank (302) defines a recess (309) above the foot rest (244).

CLAUSE 20: The vehicle (40) of any one of clauses 1 to 19, wherein the driver seat and the passenger seat are portions (54a, 56a) of a bench seat (55) connected to the frame (42) and being disposed in the cockpit area (52).

CLAUSE 21: The vehicle (40) of any one of clauses 1 to 20, further comprising a dashboard (230) connected to the frame (42), the dashboard (230) comprising a storage box (234); and wherein the fuel tank (302) is disposed in front of the storage box (234).

CLAUSE 22: The vehicle (40) of any one of clauses 1 to 21, further comprising a windshield (250) having a top edge (254) and a bottom edge (256), the windshield (250) being connected to the roll cage (106) forward of the cockpit area (52), wherein: the fuel tank (302) is disposed below and forward of the top edge (254) of the windshield (250); and at least a majority of the fuel tank (302) is disposed below and rearward of the bottom edge (256) of the windshield (250).

CLAUSE 23: The vehicle (40) of any one of clauses 1 to 22, wherein the vehicle (40) is a side-by-side off-road vehicle.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

The invention claimed is:

1. A vehicle comprising:
a frame defining a cockpit area, the frame comprising a roll cage disposed over the cockpit area, the roll cage comprising longitudinal legs each having a front end;
a driver seat connected to the frame and being disposed in the cockpit area;
a passenger seat connected to the frame and being disposed in the cockpit area, the passenger seat being disposed beside the driver seat;
an engine connected to the frame;
a plurality of ground engaging members operatively connected to the frame, at least one ground engaging member of the plurality of ground engaging members being operatively connected to the engine; and
a fuel tank assembly comprising a fuel tank connected to the frame, the fuel tank being forward of the seats, at least a portion of the fuel tank being disposed under the roll cage, a portion of the fuel tank being disposed forward of the front ends of the longitudinal legs of the roll cage, and another portion of the fuel tank being disposed rearward of the front ends of the longitudinal legs of the roll cage.

2. The vehicle of claim 1, wherein a majority of the fuel tank is disposed under the roll cage.

3. The vehicle of claim 1, wherein the fuel tank is disposed forward of the cockpit area and rearward of a front end of the frame.

4. The vehicle of claim 1, wherein:
the driver seat is disposed on a first side of a longitudinal centerline of the vehicle;
the passenger seat is disposed on a second side of the longitudinal centerline of the vehicle; and
a majority of the fuel tank is disposed on the second side.

5. The vehicle of claim 1, wherein at least the portion of the fuel tank is disposed under a projection of the roll cage onto a horizontal plane.

6. The vehicle of claim 1, wherein:
members of the frame disposed forward of the seats form a cage; and
the fuel tank is housed in the cage.

7. The vehicle of claim 1, further comprising a fender wall connected to the frame; and
wherein the fuel tank is disposed rearward of the fender wall.

8. The vehicle of claim 1, further comprising a cockpit front wall connected to the frame, the cockpit front wall being disposed forward of the passenger seat; and
wherein the fuel tank is disposed forward of the cockpit front wall.

9. The vehicle of claim 1, further comprising:
a fender wall connected to the frame; and
a cockpit front wall connected to the frame, the cockpit front wall being disposed forward of the passenger seat and rearward of the fender wall;
wherein the fuel tank is disposed longitudinally between the cockpit front wall and the fender wall.

10. The vehicle of claim 1, wherein the fuel tank assembly further comprises:
a fuel pump fluidly connected to the fuel tank; and
a fuel line fluidly communicating the fuel tank with the engine for delivering fuel from the fuel tank to the engine, the fuel line passing between the driver and passenger seats.

11. The vehicle of claim 1, wherein the fuel tank is disposed in front of the passenger seat.

12. The vehicle of claim 1, wherein the driver seat and the passenger seat are portions of a bench seat connected to the frame and being disposed in the cockpit area.

13. The vehicle of claim 1, further comprising a windshield having a top edge and a bottom edge, the windshield being connected to the roll cage forward of the cockpit area, wherein:

the fuel tank is disposed below and forward of the top edge of the windshield;
a portion of the fuel tank is disposed below and forward of the bottom edge of the windshield; and
a majority of the fuel tank is disposed below and rearward of the bottom edge of the windshield.

14. The vehicle of claim 1, wherein the vehicle is a side-by-side off-road vehicle.

15. The vehicle of claim 1, wherein:
the cockpit area and the roll cage together define at least in part a cockpit module; and
the frame further comprises:
   a front suspension module disposed forward of the cockpit module and connected thereto, at least a majority of the fuel tank being disposed rearward of the front suspension module; and
   a rear suspension module disposed rearward of the cockpit module and connected thereto, the fuel tank being disposed completely forward of the rear suspension module, and the engine being disposed rearward of the cockpit area in the rear suspension module.

16. The vehicle of claim 15, further comprising:
a front shock absorber assembly pivotally connected to the frame at a first upper connection point; and
a rear shock absorber assembly pivotally connected to the frame at a second upper connection point;
wherein the fuel tank is disposed below a line passing through the first and second upper connection points of the front and rear shock absorber assemblies to the frame.

17. The vehicle of claim 1, wherein:
the fuel tank assembly further comprises a filler neck connected to the fuel tank; and
the filler neck is disposed rearward of the front ends of the longitudinal legs of the roll cage.

18. The vehicle of claim 17, wherein the filler neck extends upward, rightward and rearward from a top, right and rear portion of the fuel tank.

19. The vehicle of claim 17, further comprising:
body panels connected to the frame; and
at least one of the body panels is disposed over the filler neck.

20. A vehicle comprising:
a frame defining a cockpit area, the frame comprising a roll cage disposed over the cockpit area, the roll cage comprising longitudinal legs each having a front end;
a driver seat connected to the frame and being disposed in the cockpit area;
a passenger seat connected to the frame and being disposed in the cockpit area, the passenger seat being disposed beside the driver seat;
an engine connected to the frame;
a plurality of ground engaging members operatively connected to the frame, at least one ground engaging member of the plurality of ground engaging members being operatively connected to the engine; and
a fuel tank assembly comprising:
   a fuel tank connected to the frame, the fuel tank being forward of the seats, and at least a portion of the fuel tank being disposed under the roll cage;
   a filler neck connected to the fuel tank, the filler neck being disposed rearward of the front ends of the longitudinal legs of the roll cage, the filler neck extending vertically higher than the front ends of the longitudinal legs of the roll cage.

21. A vehicle comprising:
a frame defining a cockpit area, the frame comprising a roll cage disposed over the cockpit area, the cockpit area having a floor;
a driver seat connected to the frame and being disposed in the cockpit area on a driver side;
a passenger seat connected to the frame and being disposed in the cockpit area on a passenger side, the passenger seat being disposed beside the driver seat,
the driver side and the passenger side being on opposite sides of a longitudinal centerline of the vehicle;
a foot well and a foot rest disposed in front of the passenger seat on the passenger side;
an engine connected to the frame;
a plurality of ground engaging members operatively connected to the frame, at least one ground engaging member of the plurality of ground engaging members being operatively connected to the engine; and
a fuel tank assembly comprising a fuel tank connected to the frame, the fuel tank being forward of the seats, and at least a portion of the fuel tank being disposed under the roll cage,
the fuel tank being disposed in front of the passenger seat such that at least a majority of the fuel tank is disposed on the passenger side,
the fuel tank being disposed over a portion of the floor, the foot well and the foot rest such that at least a portion of the fuel tank is laterally and longitudinally aligned with the portion of the floor, the foot well and the foot rest,
a lower surface of the fuel tank being vertically spaced from the portion of the floor, and
the foot rest is disposed vertically between the lower surface of the fuel tank and the portion of the floor.

22. The vehicle of claim 21, wherein the lower surface of the fuel tank defines a recess above the foot rest.

23. The vehicle of claim 21, further comprising a dashboard connected to the frame, the dashboard comprising a storage box; and
wherein the fuel tank is disposed in front of the storage box and at least a portion of the fuel tank is at a same vertical level as a portion of the storage box.

* * * * *

UNITED STATES PATENT AND TRADEMARK OFFICE
CERTIFICATE OF CORRECTION

| | | |
|---|---|---|
| PATENT NO. | : 11,260,746 B2 | Page 1 of 1 |
| APPLICATION NO. | : 16/319434 | |
| DATED | : March 1, 2022 | |
| INVENTOR(S) | : Andre Denis et al. | |

It is certified that error appears in the above-identified patent and that said Letters Patent is hereby corrected as shown below:

On the Title Page

In Item (56) REFERENCES CITED:
The first foreign reference should read --CN 101878146 A 11/2010--

Signed and Sealed this
Eleventh Day of July, 2023

Katherine Kelly Vidal
Director of the United States Patent and Trademark Office